(12) United States Patent
Patel et al.

(10) Patent No.: US 12,234,356 B2
(45) Date of Patent: Feb. 25, 2025

(54) EPOXY COMPOSITIONS CONTAINING POLYROTAXANE ADDITIVES HAVING IMPROVED IMPACT STRENGTH

(71) Applicants: Saudi Arabian Oil Company, Dhahran (SA); William Marsh Rice University, Houston, TX (US)

(72) Inventors: Hasmukh A. Patel, Katy, TX (US); Ali Zein Khater, Houston, TX (US); Peter Boul, Houston, TX (US); Pulickel M. Ajayan, Houston, TX (US); Muhammad M. Rahman, Houston, TX (US)

(73) Assignees: William Marsh Rice University, Houston, TX (US); Saudi Arabian Oil Company, Dhahran (SA)

( * ) Notice: Subject to any disclaimer, the term of this patent is extended or adjusted under 35 U.S.C. 154(b) by 136 days.

(21) Appl. No.: 17/550,638

(22) Filed: Dec. 14, 2021

(65) Prior Publication Data
US 2023/0183470 A1 Jun. 15, 2023

(51) Int. Cl.
*C08L 63/00* (2006.01)
(52) U.S. Cl.
CPC .................................. *C08L 63/00* (2013.01)
(58) Field of Classification Search
CPC ....................................................... C08L 63/00
See application file for complete search history.

(56) References Cited

U.S. PATENT DOCUMENTS

| | | |
|---|---|---|
| 1,811,799 A | 6/1931 | Lukens |
| 2,705,050 A | 3/1955 | Davis et al. |
| 3,301,797 A | 1/1967 | Drucket et al. |
| 3,481,903 A | 12/1969 | Alelio |
| 3,887,009 A | 6/1975 | Miller et al. |
| 3,938,594 A | 2/1976 | Rhudy et al. |
| 4,137,182 A | 1/1979 | Golinkin |
| 4,272,430 A | 6/1981 | Pieh et al. |
| 4,615,809 A | 10/1986 | King |
| 4,771,112 A | 9/1988 | Engelbrecht |
| 4,797,433 A | 1/1989 | Lahalih |

(Continued)

FOREIGN PATENT DOCUMENTS

| | | |
|---|---|---|
| BR | 102018014722 | 4/2020 |
| CN | 104204035 | 12/2014 |

(Continued)

OTHER PUBLICATIONS

U.S. Appl. No. 16/393,016 filed Apr. 24, 2019, Hakimuddin.
(Continued)

*Primary Examiner* — Ling Siu Cho
*Assistant Examiner* — Andrea Wu
(74) *Attorney, Agent, or Firm* — Fish & Richardson P.C.

(57) ABSTRACT

This document relates to epoxy compositions containing a sliding-ring polymer (polyrotaxane) additive and a thermally-curable epoxy resin. The epoxy compositions exhibit increased flexural toughness and impact resistance as compared to the same epoxy composition that does not contain the additive. This document also relates to 3D-printed epoxy compositions containing a sliding-ring polymer (polyrotaxane) additive and a thermally-curable epoxy resin.

22 Claims, 9 Drawing Sheets

(56) References Cited

U.S. PATENT DOCUMENTS

| | | |
|---|---|---|
| 4,883,126 A | 11/1989 | Leland |
| 5,007,481 A | 4/1991 | Williams et al. |
| 5,062,897 A | 11/1991 | Katsunnata |
| 5,159,828 A | 11/1992 | Steiger |
| 5,352,290 A | 10/1994 | Takeshita et al. |
| 5,401,312 A | 3/1995 | Hanst |
| 5,645,637 A | 7/1997 | Yaniv |
| 5,891,983 A | 4/1999 | Albrecht |
| 6,089,318 A | 7/2000 | Laramay et al. |
| 6,324,916 B1 | 12/2001 | Jessop |
| 6,609,067 B2 | 8/2003 | Tare |
| 6,664,215 B1 | 12/2003 | Tomlinson |
| 6,668,927 B1 | 12/2003 | Chatterji et al. |
| 6,828,378 B2 | 12/2004 | Okumura et al. |
| 6,844,852 B1 | 1/2005 | Simons |
| 7,077,199 B2 | 7/2006 | Vinegar et al. |
| 7,497,258 B2 | 3/2009 | Savery et al. |
| 7,523,784 B2 | 4/2009 | Lewis et al. |
| 7,525,872 B2 | 4/2009 | Tang et al. |
| 7,527,098 B2 | 5/2009 | Santra et al. |
| 7,555,414 B2 | 6/2009 | Calhoun |
| 7,612,142 B2 | 11/2009 | Ito et al. |
| 7,622,527 B2 | 11/2009 | Ito et al. |
| 7,637,319 B2 | 12/2009 | Savery et al. |
| 7,654,326 B1 | 2/2010 | Santra et al. |
| 7,773,454 B2 | 8/2010 | Barolak et al. |
| 7,787,327 B2 | 8/2010 | Tang et al. |
| 7,799,867 B2 | 9/2010 | Ito et al. |
| 7,833,344 B2 | 11/2010 | Santra et al. |
| 7,847,049 B2 | 12/2010 | Ito et al. |
| 7,893,011 B2 | 2/2011 | Lewis et al. |
| 7,893,168 B2 | 2/2011 | Ito et al. |
| 7,943,718 B2 | 5/2011 | Ito et al. |
| 7,981,943 B2 | 7/2011 | Ito et al. |
| 8,007,911 B2 | 8/2011 | Ito et al. |
| 8,017,688 B2 | 9/2011 | Ito et al. |
| 8,124,569 B2 | 2/2012 | Khan et al. |
| 8,142,562 B2 | 3/2012 | Klettke et al. |
| 8,309,498 B2 | 11/2012 | Funkhouser et al. |
| 8,382,476 B2 | 2/2013 | Schulte et al. |
| 8,418,763 B1 | 4/2013 | Deen et al. |
| 8,450,252 B2 | 5/2013 | Funkhouser et al. |
| 8,450,415 B2 | 5/2013 | Ito et al. |
| 8,580,906 B2 | 11/2013 | Hayashi et al. |
| 8,587,493 B2 | 11/2013 | Dickey et al. |
| 8,620,636 B2 | 12/2013 | Zhan et al. |
| 8,673,364 B2 | 3/2014 | Jalota et al. |
| 8,770,038 B2 | 7/2014 | Secq |
| 8,899,331 B2 | 12/2014 | Burnham |
| 9,023,150 B2 | 5/2015 | Brenneis et al. |
| 9,068,051 B2 | 6/2015 | Yamasaki et al. |
| 9,085,487 B2 | 7/2015 | Da Silva et al. |
| 9,163,499 B2 | 10/2015 | Adams et al. |
| 9,228,993 B2 | 1/2016 | Shine et al. |
| 9,266,972 B2 | 2/2016 | Yamasaki et al. |
| 9,375,699 B2 | 6/2016 | Ladet |
| 9,428,682 B2 | 8/2016 | Muthusamy et al. |
| 9,617,460 B2 | 4/2017 | Reddy |
| 9,708,869 B2 | 7/2017 | Sarmah et al. |
| 10,009,994 B2 | 6/2018 | Sawada et al. |
| 10,048,336 B2 | 8/2018 | Hakimuddin |
| 10,060,242 B2 | 8/2018 | Benoit et al. |
| 10,150,905 B1 | 12/2018 | Reddy |
| 10,351,758 B2 | 7/2019 | Hull et al. |
| 10,647,909 B2 | 5/2020 | Li et al. |
| 10,836,950 B1 | 11/2020 | Patel et al. |
| 10,871,061 B2 | 12/2020 | Hull et al. |
| 10,913,683 B2 | 2/2021 | Rahman et al. |
| 10,966,317 B2 | 3/2021 | Abe et al. |
| 11,078,406 B2 | 8/2021 | Hull et al. |
| 11,130,900 B2 | 9/2021 | Patel et al. |
| 11,230,497 B2 | 1/2022 | Patel et al. |
| 2003/0138398 A1 | 7/2003 | Okumura et al. |
| 2006/0048671 A1 | 3/2006 | Ong |
| 2008/0006410 A1 | 1/2008 | Looney et al. |
| 2008/0156225 A1 | 7/2008 | Bury |
| 2008/0287633 A1 | 11/2008 | Drumheller |
| 2009/0030108 A1 | 1/2009 | Ito et al. |
| 2009/0214871 A1 | 8/2009 | Fukuda et al. |
| 2009/0312491 A1 | 12/2009 | Ito et al. |
| 2009/0312492 A1 | 12/2009 | Ruslim et al. |
| 2010/0006288 A1 | 1/2010 | Santra et al. |
| 2012/0006551 A1 | 1/2012 | Carman et al. |
| 2012/0322695 A1 | 12/2012 | Kefi et al. |
| 2013/0118740 A1 | 5/2013 | Sherman et al. |
| 2014/0096964 A1 | 4/2014 | Chakraborty et al. |
| 2014/0342531 A1 | 11/2014 | Tominaga et al. |
| 2015/0024122 A1 | 1/2015 | Wu et al. |
| 2015/0033719 A1 | 2/2015 | Lawrence et al. |
| 2015/0057196 A1 | 2/2015 | Debord et al. |
| 2015/0061669 A1 | 3/2015 | Hakimuddin |
| 2015/0152724 A1 | 6/2015 | Amendt et al. |
| 2015/0198008 A1 | 7/2015 | Smith et al. |
| 2016/0102238 A1 | 4/2016 | Muthusamy et al. |
| 2016/0177655 A1 | 6/2016 | Fripp |
| 2016/0264813 A1 | 9/2016 | Sawada et al. |
| 2017/0066959 A1 | 3/2017 | Hull et al. |
| 2017/0218248 A1 | 8/2017 | Boul et al. |
| 2017/0335044 A1* | 11/2017 | Hayashi ............... C08G 65/332 |
| 2017/0369761 A1 | 12/2017 | Jones et al. |
| 2018/0045870 A1 | 2/2018 | Asahi et al. |
| 2018/0215988 A1 | 8/2018 | Gamwell et al. |
| 2018/0335494 A1 | 11/2018 | Hakimuddin |
| 2019/0054536 A1 | 2/2019 | Xu et al. |
| 2019/0077071 A1 | 3/2019 | Ware et al. |
| 2019/0144569 A1 | 5/2019 | Ke et al. |
| 2019/0211658 A1 | 7/2019 | Hull et al. |
| 2019/0310396 A1 | 10/2019 | Matsumoto et al. |
| 2020/0062877 A1* | 2/2020 | Knopf ................... C08F 220/52 |
| 2020/0277441 A1 | 9/2020 | Stoddart et al. |
| 2020/0308341 A1 | 10/2020 | Yan et al. |
| 2020/0325070 A1 | 10/2020 | Patel et al. |
| 2021/0024806 A1 | 1/2021 | Patel et al. |
| 2021/0024808 A1 | 1/2021 | Schipper et al. |
| 2021/0024814 A1 | 1/2021 | Schipper et al. |
| 2021/0087419 A1 | 3/2021 | Zhu et al. |
| 2021/0101833 A1 | 4/2021 | Thaemlitz et al. |
| 2021/0102112 A1 | 4/2021 | Patel |
| 2021/0130676 A1 | 5/2021 | Patel et al. |
| 2021/0198558 A1 | 7/2021 | Hull et al. |
| 2021/0198559 A1 | 7/2021 | Hull et al. |
| 2021/0222055 A1 | 7/2021 | Schipper et al. |
| 2021/0302292 A1 | 9/2021 | Boul et al. |

FOREIGN PATENT DOCUMENTS

| | | |
|---|---|---|
| CN | 107522436 | 12/2017 |
| CN | 109133754 | 1/2019 |
| CN | 112456870 | 3/2021 |
| EP | 0383348 | 8/1990 |
| EP | 2820413 | 1/2015 |
| EP | 3060909 | 8/2016 |
| JP | H 10158045 | 6/1998 |
| JP | 2006316089 A * | 11/2006 |
| JP | 2016088878 | 5/2016 |
| JP | 6647751 | 2/2020 |
| WO | WO 2016053319 | 4/2016 |
| WO | WO 2016080674 | 5/2016 |
| WO | WO 2019090140 | 5/2019 |
| WO | WO 2019147559 | 8/2019 |

OTHER PUBLICATIONS

U.S. Appl. No. 16/593,820, filed Oct. 4, 2019, Patel et al.
U.S. Appl. No. 16/668,730, filed Oct. 30, 2019, Patel et al.
U.S. Appl. No. 17/107,428, filed Nov. 30, 2020, Hull et al.
U.S. Appl. No. 17/550,631, filed Dec. 14, 2021, Patel et al.
U.S. Appl. No. 63/289,308, filed Dec. 14, 2021, Hull et al.
Acquah et al., "Carbon Nanotubes and Graphene as Additives in 3D Printing," Carbon Nanotubes—Current Progress of Their Polymer Composites, InTech, 2016, 26 pages.

(56) References Cited

OTHER PUBLICATIONS

Adhikary et al., "Effects of carbon nanotubes on expanded glass and silica aerogel based lightweight concrete," Nature, Scientific Reports, Jan. 2021, 11:2104, 11 pages.

Andrew, "Global $CO_2$ emissions from cement production," Earth Syst. Sci. Data, Jan. 2018, 10:195-217, 23 pages.

API, "10B-2, Recommended Practice for Testing Well Cements," American Petroleum Institute, Apr. 2019, 1-124, RP 10B-2, 124 pages.

Arbad et al., "A Review of Recent Research on Contamination of Oil Well Cement with Oil-Based Drilling Fluid and the Need of New and Accurate Correlations," ChemEngineering, Apr. 2020, 20 pages.

Arts et al., "Seismic monitoring at the Sleipner underground $CO_2$ storage site (North Sea)," in Baines et al., Geologic Storage of Carbon Dioxide, London: Geologic Society Special Publications, 2004, 11 pages.

Ashik et al., "A review on methane transformation to hydrogen and nanocarbon: Relevance of catalyst characteristics and experimental parameters on yield," Renewable and Sustainable Energy Reviews, Sep. 2017, 76:743-767, 25 pages.

asmi.jp [online], "SeRM Series Products List," asmi.jp, Advanced Softmaterials Inc., retrieved from URL <www.asmi.jp/en/product#sec_03>, retrieved on Aug. 15, 2019, available on or before Jan. 2013 (via wayback machine URL <https://web.archive.org/web/20130315000000*/www.asmi.jp/en/product>), 5 pages.

Bagheri et al., "Rubber-toughened epoxies: a critical review," Journal of Macromolecular Science, Part C: Polymer Reviews, Aug. 2009, 49.3:201-225, 25 pages.

Bett, "Geothermal Well Cementing, Materials and Placement Techniques," United Nations University, Geothermal Training Programme, Reports 2010, No. 10, 2010, 32 pages.

Beyer, "Evolution of reservoir properties in the Lower Triassic aquifer sandstones of the Thuringian Syncline in Central Germany," Dissertation zur Erlangung des akademischen Grades doctor rerum naturalium, Dr. rer. nat., Friedrich-Schiller-Universitaet Jena, 2015, 221 pages.

Bouzalakos et al., "Overview of carbon dioxide ($CO_2$) capture and storage technology," Developments and Innovation in Carbon Dioxide ($CO_2$) Capture and Storage Technology, 2010, 1:1-24, 24 pages.

Brichni et al., "Optimisation of Magnesium Oxychloride Cement Properties by Silica Glass," Adv. Cem. Res., Jul. 2016, 28:10 (654-663), 10 pages.

Bruns and Stoddart, "The Nature of the Mechanical Bond: from molecules to machines," Wiley, 2017, 786 pages.

Buchanan et al., "Metal 3D printing in construction: A review of methods, research, applications, opportunities and challenges," Engineering Structures, Feb. 2019, 180:332-348, 36 pages.

Cao et al., "Study of the in-situ growth of carbon nanofibers on cement clinker," Mater. Res. Express, May 2020, 7:5 (055306), 10 pages.

Capper et al., "Internal antiplasticisation in highly crosslinked amine cured multifunctional epoxy resins," Polymer, 2018, 146:321-330, 11 pages.

Carey et al., "Fracture-permeability behavior of shale," Journal of Unconventional Oil and Gas Resources, Sep. 2015, 11, 53 pages.

Ceglar et al., "Deepwater outcrop analogue study: basal Bunkers Sandstone, Donkey Bore Syncline, Northern Flinders Ranges, Australia," Petroleum Exploration Society of Australia (PESA), presented at the PESA Eastern Australia Basins Symposium II, Adelaide, 2004, 11 pages.

Chambers et al., "Liquid crystal elastomer—nanoparticle systems for actuation," Journal of Materials Chemistry, 2009, 19.11:1524-1531, 7 pages.

Chatham et al., "A review of the process physics and material screening methods for polymer powder bed fusion additive manufacturing," Progress in Polymer Science, Jun. 2019, 93:68-95, 28 pages.

Chen et al., "Enhancement of mechanical and wear resistance performance in hBN reinforced epoxy nanocomposites," Polym. Int., 2017, 66: 659, 25 pages.

Chen et al., "Rapid control of phase growth by nanoparticles," Nature Communications, May 2014, 5.1, 9 pages.

Cho et al., "Cell-Encapsulating Hydrogel Puzzle: Polyrotaxane-Based Self-Healing Hydrogels," Chem. Eur. J., 2019, 26:4 (913-920), 22 pages.

Choi et al., "Highly elastic binders integrating polyrotaxanes for silicon microparticle anodes in lithium ion batteries," Science, Jul. 2017, 357.6348:279-283, 5 pages.

Cordero et al., "Strengthening of ferrous binder jet 3D printed components through bronze infiltration," Additive Manufacturing, May 2017, 15:87-92, 6 pages.

Cui et al., "Electrical and mechanical properties of electrically conductive adhesives from epoxy, micro-silver flakes, and nano-hexagonal boron nitride particles after humid and thermal aging," International Journal of Adhesion and Adhesives, Jul. 2013, 44:232-236, 5 pages.

Davidson et al., "3D Printable and Reconfigurable Liquid Crystal Elastomers with Light-Induced Shape Memory via Dynamic Bond Exchange," Advanced Materials, Jan. 2020, 6 pages.

DebRoy et al., "Additive manufacturing of metallic components—process, structure and properties," Progress in Materials Science, Mar. 2018, 92:112-224, 114 pages.

DebRoy et al., "Scientific, technological and economic issues in metal printing and their solutions," Nature Materials, Jul. 2019, 18, 7 pages.

Dowling et al., "A review of critical repeatability and reproducibility issues in powder bed fusion," Materials & Design, Jan. 2020, 186, 18 pages.

Eiken et al., "Lessons learned from 14 years of CCS operations: Sleipner, In Salah and Snøhvit," Energy Procedia, 2011, 4: 5541-5548, 8 pages.

El-Wardany et al., "Challenges in three-dimensional printing of high-conductivity copper," Journal of Electronic Packaging, Jun. 2018, 140.2:020907, 12 pages.

Enayatpour et al., "Advanced Modeling of Cement Displacement Complexities," SPE/IADC-184702-MS, Society of Petroleum Engineers (SPE), presented at the SPE/IADC Drill Conference and Exhibition, Mar. 2017, 21 pages.

EPA, "UIC Pressure Falloff Testing Guideline," EPA Region 6, Aug. 8, 2002, 29 pages.

Fayazfar et al., "A critical review of powder-based additive manufacturing of ferrous alloys: Process parameters, microstructure and mechanical properties," Materials & Design, Apr. 2018, 144:98-128, 31 pages.

Foldyna et al., "Dispersion of carbon nanotubes for application in cement composites," Science Direct, Procedia Engineering, 2016, 149:94-99, 6 pages.

Funkhouser and Norman, "Synthetic Polymer Fracturing Fluid for High-Temperature Application," SPE 80236, Society of Petroleum Engineers (SPE), International Symposium on Oilfield Chemistry, Feb. 5-7, 2003, 6 pages.

Gaillard et al., "Novel Associative Acrylamide-based Polymers for Proppant Transport in Hydraulic Fracturing Fluids," SPE 164072, Society of Petroleum Engineers (SPE), SPE International Symposium on Oilfield Chemistry, Apr. 8-10, 2013, 11 pages.

Gelebart et al., "Photoresponsive fiber array: toward mimicking the collective motion of cilia for transport applications," Advanced Functional Materials, Aug. 2016, 26.29:5322-5327, 6 pages.

Genedy et al., "Examining epoxy-based nanocomposites in wellbore seal repair for effective $CO_2$ sequestration," Energy Procedia, Jan. 2014, 63:5798-5807, 10 pages.

Gislason et al., "Carbon Storage in Basalt," Science, 2014, 344:6182 (373-374), 3 pages.

Gladman et al., "Biomimetic 4D printing," Nature Materials, Apr. 2016, 15.4:413-418, 7 pages.

Global Status of CCS Report, Dec. 11, 2020, Global CCS Institute, 44 pages.

Goeppert et al., "Air as the renewable carbon source of the future: an overview of $CO_2$ capture from the atmosphere," Energy Environ. Sci., 2012, 5: 7833, 12 pages.

(56) References Cited

OTHER PUBLICATIONS

Gojny et al., "Carbon nanotube-reinforced epoxy-composites: enhanced stiffness and fracture toughness at low nanotube content," Compos. Sci. Technol., 2004, 64:2363-2371, 9 pages.
Gong et al., "Analysis of defect generation in Ti—6Al—4V parts made using powder bed fusion additive manufacturing processes," Additive Manufacturing, Oct. 2014, 1, 60 pages.
Gorsse et al., "Additive manufacturing of metals: a brief review of the characteristic microstructures and properties of steels, Ti—6Al—4V and high-entropy alloys," Science and Technology of Advanced Materials, Dec. 2017, 18.1:584-610, 28 pages.
Guo et al., "Shape memory epoxy composites with high mechanical performance manufactured by multi-material direct ink writing," Compos. Part A Appl. Sci. Manuf., 2020, 135: 105903, 8 pages.
Gupta and Carman, "Fracturing Fluid for Extreme Temperature Conditions is Just as Easy as the Rest," SPE 140176, Society of Petroleum Engineers (SPE), SPE Hydraulic Fracturing Technology Conference, Jan. 24-26, 2011, 5 pages.
Hannis et al., "$CO_2$ Storage in Depleted or Depleting Oil and Gas Fields: What can We Learn from Existing Projects?" Energy Procedia, 2017, 114: 5680-5690, 11 pages.
Harada et al., "Preparation and properties of inclusion complexes of polyethylene glycol with α-cyclodextrin," Macromolecules, 1993, 26:5698-5703, 6 pages.
Harada et al., "Supramolecular polymeric materials via cyclodextrin—guest interactions," Accounts of Chemical Research, Jul. 2014, 47.7:2128-2140, 13 pages.
Hart et al., "Material properties and applications of mechanically interlocked polymers," Nat. Rev. Mater., 2021, 6:6 (508-530), 23 pages.
Hepburn et al., "The technological and economic prospects for $CO_2$ utilization and removal," Nature, Nov. 2019, 575, 11 pages.
Herzog et al., "Additive Manufacturing of Metals," Acta Mater. 2016, 117:371-392, 22 pages.
Hitzler et al., "In-plane anisotropy of selective laser-melted stainless steel: The importance of the rotation angle increment and the limitation window," Proceedings of the Institution of Mechanical Engineers, Part L: Journal of Materials: Design and Applications, Jul. 2019, 233.7:1419-1428, 10 pages.
Hojjatzadeh et al., "Direct observation of pore formation mechanisms during LPBF additive manufacturing process and high energy density laser welding," International Journal of Machine Tools and Manufacture 153:103555, Jun. 2020, 32 pages.
Houben et al., "Plasticization behavior of crown-ether containing polyimide membranes for the separation of $CO_2$," Separation and Purification Technology, 2021, 255:117307, 10 pages.
Hoyos-Palacio et al., "Catalytic effect of Fe, Ni, Co and Mo on the CNTs production," IOP Conference Series: Materials Science and Engineering, 2014, 59:012005, 9 pages.
Huang et al., "Finite element analysis of thermal behavior of metal powder during selective laser melting," International Journal of Thermal Sciences, Jun. 2016, 104:146-157, 12 pages.
Hull et al., "Chemomechanical Effects of Oxidizer-$CO_2$ Systems Upon Hydraulically Fractured Unconventional Source Rock," Canadian Journal of Chemical Engineering, 2021, 26 pages.
Hull et al., "Oxidative Kerogen Degradation: A Potential Approach to Hydraulic Fracturing in Unconventionals," Energy Fuels, 2019, 33: 4758-4766, 8 pages.
Hull et al., "Synthesis and structural characterization of $CO_2$-soluble oxidizers [$Bu_4N$]$BrO_3$ and [$Bu_4N$]$ClO_3$ and their dissolution in cosolvent-modified $CO_2$ for reservoir applications," RSC Advances, Royal Society of Chemistry, Dec. 21, 2020, 10: 44973, 8 pages.
Hur et al., "Reactive force fields for modeling oxidative degradation of organic matter in geological formations," RSC Adv. 2021, 11:29298-29307, 23 pages.
IEAGHG, "Case Studies of $CO_2$ Storage in Depleted Oil and Gas Fields," International Energy Agency Greenhouse Gas R&D Programme, IEAGHG, 2017, 172 pages.

IPCC, "Special Report on Carbon Dioxide Capture and Storage," in Metz et al., Working Group III of the Intergovernmental Panel on Climate Change, 2005, 443 pages.
Isaka et al., "Influence of long-term operation of supercritical carbon dioxide based enhanced geothermal system on mineralogical and microstructurally-induced mechanical alteration of surrounding rock mass," Renewable Energy, Jun. 2019, 136, 14 pages.
Isfahani et al., "Dispersion of multi-walled carbon nanotubes and its effects on the properties of cement composites," Cement and Concrete Composites, Nov. 2016, 74:154-163, 10 pages.
Isobe et al., "Thermally dissociable pseudo-polyrotaxane as a supramolecular shrinkage suppressor for epoxy-amine curing system," Journal of Polymer Science Part A: Polymer Chemistry, Mar. 2008, 46.6:2305-2308, 4 pages.
Jafariesfad et al., "Cement Sheath Modification Using Nanomaterials for Long-term Zonal Isolation of Oil Wells: Review," Journal of Petroleum Science and Engineering., 2017, 156:662-672, 28 pages.
Jiang et al., "Highly Stretchable and Instantly Recoverable Slide-Ring Gels Consisting of Enzymatically Synthesized Polyrotaxane with Low Host Coverage," Chem. Mater., 2018, 30:15 (5013), 10 pages.
Jin et al., "Synthesis and application of epoxy resins: A review," J. Ind. Eng. Chem., Sep. 2015, 29:1-11, 11 pages.
Kato et al., "Organic-Inorganic Hybrid Slide-Ring Gels: Polyrotaxanes Consisting of Poly(dimethylsiloxane) and γ-Cyclodextrin and Subsequent Topological Cross-Linking," Macromolecules, Aug. 18, 2009, 42:7129-7136, 8 pages.
Khuenkaew et al., "Resistance spot welding of SUS316L austenitic/SUS425 ferritic stainless steels: weldment characteristics, mechanical properties, phase transformation and solidification," Metals, Jun. 2019, 9.6, 17 pages.
Kim et al., "Development of $CO_2$-Selective Polyimide-Based Gas Separation Membranes Using Crown Ether and Polydimethylsiloxane," Polymers, 2021, 13:1927, 15 pages.
Koyanagi et al., "Movable Cross-Linked Polymeric Materials from Bulk Polymerization of Reactive Polyrotaxane Cross-Linker with Acrylate Monomers," Macromolecules 2017, 50:5695-5700, 6 pages.
Kuo et al., "Bonding behavior of repair material using fly-ash/ground granulated blast furnace slag-based geopolymer," Materials, Jan. 2019, 12.10, 16 pages.
Ladva et al., "The Cement-to-Formation Interface in Zonal Isolation," IADC/SPE 88016, Society of Petroleum Engineers (SPE), presented at the IADC/SPE Asia Pacific Drilling Technology Conference and Exhibition in Kuala Lumpur, Malaysia, Sep. 13-15, 2004, 369-382, 14 pages.
Levenfeld et al., "Effect of residual carbon on the sintering process of M2 high speed steel parts obtained by a modified metal injection molding process," Metallurgical and Materials Transactions, Jun. 2002, A:33.6 (1843-1851), 9 pages.
Lewis et al., "Direct ink writing of three-dimensional ceramic structures," Journal of the American Ceramic Society, Dec. 2006, 89.12:3599-3609, 11 pages.
Li et al., "Contamination of Cement Slurries with Diesel-Based Drilling Fluids in a Shale Gas Well," J. Nat. Gas Sci. Eng., Aug. 2015, 27:1312-1320, 9 pages.
Li et al., "Residual stress in metal additive manufacturing," Procedia Cirp, Jan. 2018, 71:348-353, 6 pages.
Li et al., "Slide-ring shape memory polymers with movable crosslinks," React. Funct. Polym., 2017, 119:26-36, 25 pages.
Li et al., "The pore-fracture system properties of coalbed methane reservoirs in the Panguan Syncline, Guizhou, China," Geoscience Frontiers, 2012, 3:6 (853-862), 10 pages.
Lin et al., "Rapid macroscale shape morphing of 3D-printed polyrotaxane monoliths amplified from pH-controlled nanoscale ring motions," J. Mater. Chem., 2018, C:6 (11956), 5 pages.
Lin et al., "Ring Shuttling Controls Macroscopic Motion in a Three-Dimensional Printed Polyrotaxane Monolith," Chem. Int. Ed., 2017, 56:4452-4457, 7 pages.
Liu et al., "A novel method to evaluate cement shale bond strength," SPE-173802-MS, Society of Petroleum Engineers (SPE), presented at the SPE International Symposium on Oilfield Chemistry, The Woodlands, Texas, Apr. 13-15, 2015, 20 pages.

(56) References Cited

OTHER PUBLICATIONS

Liu et al., "Graphene Lubricant," Applied Materials Today, 2020, 20:2020 (100662), 31 pages.

Loizzo et al., "Reusing O&G-Depleted Reservoirs for CO2 Storage: Pros and Cons," SPE 124317, Society of Petroleum Engineers (SPE), presented at the 2009 SPE Offshore Europe and Gas Conference & Exhibition, Sep. 8-11, 2009, SPE Projects, Facilities & Construction, 2010, 5:166-172, 11 pages.

Luo et al., "A survey of finite element analysis of temperature and thermal stress fields in powder bed fusion additive manufacturing," Additive Manufacturing, May 2018, 21:318-332, 15 pages.

Mather et al., "Michael addition reactions in macromolecular design for emerging technologies," Progress in Polymer Science, May 2006, 31.5:487-531, 45 pages.

Mayumi et al., "Structure and dynamics of polyrotaxane and slide-ring materials," Polymer, 2010, 51:959-967, 9 pages.

Mikhalchan et al., "Aligned carbon nanotube-epoxy composites: the effect of nanotube organization on strength, stiffness, and toughness," J. Mater. Sci., 2016, 51:10005-10025, 21 pages.

Mostafaei et al., "Binder jet 3D printing—Process parameters, materials, properties, modeling, and challenges," Progress in Materials Science, Jun. 2021, 119:100707, 141 pages.

Nakahata et al., "Self-Healing Materials Formed by Cross-Linked Polyrotaxanes with Reversible Bonds," Chem, 2016, 1:5 (766-775), 11 pages.

Nelson and Guillot, "Well Cementing," Second Edition, Schlumberger, 2006, 807 pages.

Obayi et al., "Effect of grain sizes on mechanical properties and biodegradation behavior of pure iron for cardiovascular stent application," Biomatter, Jan. 2016, 6.1:e959874, 10 pages.

Ohm et al., "Liquid Crystalline Elastomers as Actuators and Sensors," Advanced Materials, Aug. 2010, 22: 3366-3387, 22 pages.

Oliveira et al., "Processing parameters in laser powder bed fusion metal additive manufacturing," Materials & Design, Aug. 2020, 193, 12 pages.

Opedal et al., "Experimental study on the cement-formation bonding," SPE 168138, Society of Petroleum Engineers (SPE), presented at the SPE International Symposium and Exhibition on Formation Damage Control, Lafayette, Louisiana, Feb. 26-28, 2014, 12 pages.

Pau et al., "High-resolution simulation and characterization of density-driven flow in $CO_2$ storage in saline aquifers," Advances in Water Resources, 2010, 33:4 (443-455), 13 pages.

Payenberg et al., "Architecture of a deep-water, salt-withdrawal mini-basin, Donkey Bore Syncline, Australia," in Nilse et al., Atlas of Deep-Water Outcrops, 2008, 6 pages.

Peerzada et al., "Additive Manufacturing of Epoxy Resins: Materials, Methods, and Latest Trends," Ind. Eng. Chem. Res., 2020, 59:14, 52 pages.

Prabhakar et al., "Enhancing the Gel Transition Time and Right-Angle-Set Property of Oil Well Cement Slurries by Incorporating CSA Cement and Gypsum," IPTC-19224-MS, International Petroleum Technology Conference, Mar. 2019, 12 pages.

Prajapati et al., "Measurement of anisotropic thermal conductivity and inter-layer thermal contact resistance in polymer fused deposition modeling (FDM)," Additive Manufacturing, May 2018, 21:84-90, 7 pages.

Pruksawan et al., "Homogeneously Dispersed Polyrotaxane in Epoxy Adhesive and Its Improvement in the Fracture Toughness," Macromolecules, 2019, 52:2464-2475, 12 pages.

Radonjic and Oyibo, "Experimental evaluation of wellbore cement-formation shear bond strength in presence of drilling fluid contamination," International Conference on porous media and their applications in science, engineering and industry, Hawaii, Jun. 24, 2014, 7 pages.

Ramsdale-Capper et al., "Internal antiplasticisation in highly cross-linked amine cured multifunctional epoxy resins," Polymer, Jun. 2018, 146:321-330, 10 pages.

Reddy et al., "Relating Cement Additive Performance to Mix Water Composition for Deep Water and Salt Zone Applications," SPE-180344-MS, Society of Petroleum Engineers (SPE), SPE Deepwater Drilling and Completions Conference 2016, Sep. 2016, 20 pages.

Rimdusit et al., "Shape memory polymers from benzoxazine-modified epoxy," Smart Mater. Struct., 2013, 22:075033, 13 pages.

Ringrose, "How to store $CO_2$ underground: insights from early-mover CCS projects" Springer, 2020, 141 pages.

Roca et al., "Policy needed for additive manufacturing," Nature Materials, Aug. 2016, 15:8, 4 pages.

Saed et al., "Molecularly-engineered, 4D-Printed liquid crystal elastomer actuators," Advanced Functional Materials, 2019, 29.3, 9 pages.

Sajadi et al., "Direct ink writing of cement structures modified with nanoscale additive," Advanced Engineering Materials, Aug. 2019, 21.8:1801380, 10 pages.

Seo et al., "Development of a supramolecular accelerator simultaneously to increase the cross-linking density and ductility of an epoxy resin," Chem. Eng. J., 2019, 356:303-311, 30 pages.

Seo et al., "Enhanced Mechanical Strength, Flexibility, and Shape-Restoring Rate of a Drug-Eluting Shape-Memory Polymer by Incorporation of Supramolecular Cross-Linkers," ACS Macro Lett., 2020, 9, 389-395, 7 pages.

Simao et al., "Cementing Solutions for Salt- and $CO_2$-Laden Presalt Zones," SPE-180336-MS, Society of Petroleum Engineers (SPE), SPE Deepwater Drilling and Completions Conference Proceedings, Sep. 2016, 11 pages.

Singh et al., "Powder bed fusion process in additive manufacturing: An overview," Materials Today: Proceedings, Jan. 2020, 26:3058-3070, 13 pages.

Snow et al., "Invited Review Article: Review of the formation and impact of flaws in powder bed fusion additive manufacturing," Additive Manufacturing, Jul. 2020, 15 pages.

Soto et al., "Self-assembly of a supramolecular network with pseudo-rotaxane cross-linking nodes and its transformation into a mechanically locked structure by rotaxane formation," Chemical Communications, 2016, 52:14149, 5 pages.

Sun et al., "Short-aramid-fiber toughening of epoxy adhesive joint between carbon fiber composites and metal substrates with different surface morphology," Compos. Part B Eng., 2015, 77:38-45, 30 pages.

Tagliaferri et al., "Direct ink writing of energy materials," Materials Advances, 2021, 2.2:540-563, 24 pages.

Tao et al., "A Brief Review of Gas Migration in Oilwell Cement Slurries," Energies, 2021, 14:2369, 22 pages.

Telschow et al., "Cement Formation—A Success Story in a Black Box: High Temperature Phase Formation of Portland Cement Clinker," Industrial & Engineering Chemistry Research (I&EC Research), American Chemical Society (ACS Publications), Jul. 2012, 51:34 (10983-11004), 22 pages.

Tong et al., "Committed Emissions from Existing Energy Infrastructure Jeopardize 1.5° C Climate Target," Nature, 2019, 572:7769 (373-377), 17 pages.

Tran et al., "3D printing of highly pure copper," Metals, Jul. 2019, 9.7:756, 24 pages.

Ürk et al., "Structure-controlled growth of vertically-aligned carbon nanotube forests using iron-nickel bimetallic catalysts," Materials Advances, 2021, 2:2021-2030, 10 pages.

Utela et al., "A review of process development steps for new material systems in three dimensional printing (3DP)," Journal of Manufacturing Processes, Jul. 2008, 10.2:96-104, 9 pages.

Vyavahare et al., "Fused deposition modelling: A review," Rapid Prototyping Journal, Jan. 2020, 26 pages.

Wang et al., "Molecular Simulation of $CO_2/CH_4$ Competitive Adsorption on Shale Kerogen for $CO_2$ Sequestration and Enhanced Gas Recovery," J. Phys. Chem. C, 2018, 122:30 (17009-17018), 29 pages.

Wang et al., "Relaxation and Reinforcing Effects of Polyrotaxane in an Epoxy Resin Matrix," Macromolecules, 2006, 39:3 (1046-1052), 7 pages.

Weir et al., "Reservoir storage and containment of greenhouse gases," Transport in Porous Media, Energy Convers. Mgmt, 36, 531-534 1995, 7 pages.

(56) References Cited

OTHER PUBLICATIONS

Welch et al., "Shear strength and permeability of the cement-casing interface," International Journal of Greenhouse Gas Control, Apr. 2020, 95, 29 pages.

Wenz et al., "Cyclodextrin Rotaxanes and Polyrotaxanes," Chem. Rev., 2006, 106:782-817, 36 pages.

Wimpenny et al., "Advances in 3D printing & additive manufacturing technologies," Singapore: Springer, 2017, 195 pages.

Wu et al., "A Crown Ether-Containing Copolyimide Membrane with Improved Free Volume for $CO_2$ Separation," Industrial & Engineering Chemical Research, 2019, 58:14357-14367, 44 pages.

Wu et al., "High-strain slide-ring shape-memory polycaprolactone-based polyurethane," Soft Matter, 2018, 14:4558, 28 pages.

Yakovlev et al., "Modification of Cement Matrix Using Carbon Nanotube Dispersions and Nanosilica," Science Direct, Procedia Engineering, Modern Building Materials, Structures and Techniques, MBMST 2016, 2017, 172:1261-1269, 9 pages.

Zhan et al., "In situ-grown carbon nanotubes enhanced cement-based materials with multifunctionality," Cement and Concrete Composites, Apr. 2020, 108:103518, 11 pages.

Zhang et al., "Dibenzo-21-crown-7-ether contained 6FDA-based polyimide membrane with improved gas selectivity," Separation and Purification Technology, 2021, 264:118454, 13 pages.

Zhang et al., "Three-Dimensional Printing of Continuous Flax Fiber-Reinforced Thermoplastic Composites by Five-Axis Machine," Materials, 2020, 13:1678, 11 pages.

Zoback, "Reservoir geomechanics," Cambridge University Press, 2010, 2 pages.

\* cited by examiner

EPOXY COMPOSITIONS CONTAINING POLYROTAXANE ADDITIVES HAVING IMPROVED IMPACT STRENGTH

TECHNICAL FIELD

This disclosure describes epoxy compositions that contain a sliding-ring polymer (polyrotaxane) additive. The epoxy compositions display improved impact strength and flexural toughness as compared to epoxy compositions that do not contain the additive.

BACKGROUND

When employed as structural materials, epoxy-based polymers are designed to provide exceptional mechanical properties. However, epoxy also tends to display brittleness under sudden load due to high cross-linked density within the polymer.

Impact resistance in well construction materials, particularly for sealants, is a particularly important property for product zone sections where perforations are made and for intervals where fracturing campaigns are undertaken. These events can rubblize oil well cements. Thus, specialized materials which show high impact tolerance are sought for these applications. The lack of uniform distribution of stresses in epoxy structures can result in brittle fractures.

Therefore, there is a need for epoxy structures with enhanced strength, such as when the structure undergoes sudden impact.

SUMMARY

Provided in the present disclosure is an epoxy composition. In some embodiments, the epoxy composition includes a thermally-curable epoxy resin; fumed silica; and a sliding-ring polymer additive that contains at least two molecules of a polyrotaxane, where the polyrotaxane includes a linear polymer; at least one ring compound, where the linear polymer is threaded through the opening of the ring compound; and stopper groups disposed at both end terminals of the linear polymer.

In some embodiments of the epoxy composition, the thermally-curable epoxy resin is present in an amount of about 50 wt % to about 95 wt %, about 55 wt % to about 95 wt %, about 60 wt % to about 90 wt %, about 65 wt % to about 90 wt %, about 75 wt % to about 85 wt %, or about 80 wt % to about 85 wt % of the epoxy composition.

In some embodiments of the epoxy composition, the fumed silica is present in an amount of about 1 wt % to about 25 wt %, about 1 wt % to about 10 wt %, about 5 wt % to about 15 wt %, or about 5 wt % to about 10 wt % of the epoxy composition. In some embodiments, the fumed silica is present in an amount of about 7.5 wt % of the epoxy composition.

In some embodiments of the epoxy composition, the sliding-ring polymer additive is cross-linked polyrotaxane beads. In some embodiments, the cross-linked polyrotaxane beads are surface-functionalized with epoxide rings.

In some embodiments, the sliding-ring polymer additive is present in an amount of about 1 wt % to about 25 wt %, about 1 wt % to about 15 wt %, about 2 wt % to about 10 wt %, about 2.5 wt % to about 5 wt %, about 5 wt % to about 20 wt %, or about 10 wt % to about 15 wt % of the epoxy composition.

In some embodiments, the epoxy composition further includes a curing agent. In some embodiments, the curing agent is an etheramine or an aliphatic or aromatic diamine, triamine, tetraamine, or combinations thereof. In some embodiments, the epoxy resin and the curing agent are present in a ratio of about 75:25.

In some embodiments, the epoxy composition is 3D-printed.

In some embodiments, the epoxy composition exhibits increased strain tolerance or flexural strain as compared to the same epoxy composition without the sliding-ring polymer additive. In some embodiments, the epoxy composition exhibits a strain tolerance or flexural strain of about 0.2 to about 0.3.

In some embodiments, the epoxy composition exhibits improved flexural toughness as compared to the same composition without the sliding-ring polymer additive. In some embodiments, the epoxy composition has a flexural toughness of about 10 J/m3 to about 20 J/m3 or about 11 J/m3 to about 15 J/m3. In some embodiments, the epoxy composition has a flexural toughness of about 12 J/m3.

In some embodiments, the epoxy composition exhibits improved impact resistance as compared to the same composition without the sliding-ring polymer additive.

Also provided in the present disclosure is a method for enhancing the impact resistance of an epoxy composition. In some embodiments, the method includes adding a sliding-ring polymer additive to a thermally-curable epoxy resin, the sliding-ring polymer additive containing a linear polymer; at least one ring compound, where the linear polymer is threaded through the opening of the ring compound; and stopper groups disposed at both end terminals of the linear polymer. In some embodiments, the method includes adding fumed silica to the thermally-curable epoxy resin. In some embodiments of the method, the epoxy composition exhibits improved impact resistance as compared to the same composition without the sliding-ring polymer additive.

Also provided in the present disclosure is a method for enhancing the flexural toughness of an epoxy composition. In some embodiments, the method includes adding a sliding-ring polymer additive to a thermally-curable epoxy resin, the sliding-ring polymer additive containing a linear polymer; at least one ring compound, where the linear polymer is threaded through the opening of the ring compound; and stopper groups disposed at both end terminals of the linear polymer. In some embodiments, the method includes adding fumed silica to the thermally-curable epoxy resin. In some embodiments of the method, the epoxy composition exhibits improved flexural toughness as compared to the same composition without the sliding-ring polymer additive.

DESCRIPTION OF DRAWINGS

FIG. 3A), β-cyclodextrin (β-CD; FIG. 3B), and γ-cyclodextrin (γ-CD; FIG. 3C).

DETAILED DESCRIPTION

Figure 1:
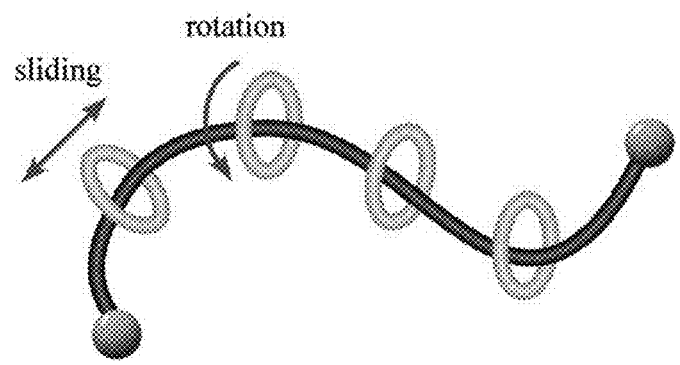
FIG. 1 is a schematic of a polyrotaxane.

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

The present disclosure provides epoxy compositions containing a thermally-curable epoxy resin, fumed silica, and a sliding-ring polymer (polyrotaxane) additive. In some embodiments, the polyrotaxane additive enhances the flexural toughness of the epoxy composition. In some embodiments, the polyrotaxane additive enhances the impact resistance of the epoxy composition.

The epoxy compositions of the present disclosure contain sliding-ring polymer additives that include chemical structures called polyrotaxanes. In some embodiments, the polyrotaxanes are made up of a linear polymer, a modified or substituted ring compound, and stopper groups on the end terminals of the linear polymer. In some embodiments, at least two molecules of the polyrotaxane are cross-linked to each other through a chemical bond. In some embodiments, the polyrotaxane forms a necklace-like structure. In some embodiments, the cyclic ring rotates, slides, or a combination thereof, upon application of external forces. In some embodiments, the rotation, sliding, or combination thereof provides for structural rearrangements. The cross-linked mechanical bond is movable, which allows the polymer chains to slide within the material. This is unlike conventional polymeric additives that contain permanently-linked covalent bonds that restrict the motion of the polymer chains. In some embodiments, the polyrotaxane additives have chemical bonds and crosslinking that do not break down upon repeated cycling of stresses, such as due to the uneven distribution of the stresses.

Without wishing to be bound by any particular theory, it is believed that the functional groups on the surface of the ring compounds, for example, hydroxyl groups (—OH) or epoxide groups on a cyclodextrin, allow for strong bonding between polymer matrix particles and the sliding-ring polymers, providing a strong interface within the polymer matrix. Furthermore, mechanical linkages (movement of ring components within polymeric networks) facilitate distribution of forces unlike chemical linkages (restricted movement of polymer chains in polymer networks) where cleavage of bonds can occur due to repeated cycles of forces.

In addition to enhancing stress distribution in the epoxy composition, the sliding-ring polymeric additives provide the ability to resist the failure of the mechanical properties of a sealant, such as set epoxy. The cross-links between polymeric chains of traditional covalently linked polymeric additives eventually break under repeated stress under downhole conditions, as the stresses are concentrated on the short chains. By contrast, the mechanical cross-links of the presently disclosed sliding-ring polymer structures remain intact after experiencing stress. The molecular level effects originating from the sliding motion through threaded rings, a pulley effect, result in uniform dispersion of stresses in the epoxy composition. The blending of sliding-ring polymers in the epoxy composition imparts the improvement in the mechanical properties, especially flexural toughness, and impact resistance. Due to the sliding motion of the polyrotaxanes, the addition of these additives into an epoxy composition thus improves the distribution of stresses throughout the matrix.

Definitions

Unless otherwise defined, all technical and scientific terms used in this document have the same meaning as commonly understood by one of ordinary skill in the art to which the present application belongs. Methods and materials are described in this document for use in the present application; other, suitable methods and materials known in the art can also be used. The materials, methods, and examples are illustrative only and not intended to be limiting. All publications, patent applications, patents, sequences, database entries, and other references mentioned in this document are incorporated by reference in their entirety. In case of conflict, the present specification, including definitions, will control.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, and 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

The term "about," as used in this disclosure, can allow for a degree of variability in a value or range, for example, within 10%, within 5%, or within 1% of a stated value or of a stated limit of a range.

As used in this disclosure, the terms "a," "an," and "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In the methods described in this disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

As used herein, the term "polyrotaxane" refers to a compound having cyclic molecules, a linear molecule included in the cyclic molecules such that the linear molecule is threaded through the cyclic molecules. In some embodiments, there are stopper groups disposed at both ends of the linear molecule so as to prevent the cyclic molecules from separating from the linear molecule. The cyclic molecules can move along the axle.

As used herein, "impact resistance" refers to the capability of a material to resist a sudden applied load or force. Impact resistance is typically expressed as the amount of mechanical energy absorbed in the process of deformation under the applied impact loading. In some embodiments, impact resistance is determined qualitatively. For example, by observing crack formation, propagation, or both.

"Mechanical properties" of an epoxy composition refer to the properties that contribute to the overall behavior of the material or composition when subjected to an applied force, for example, the frequent stresses cement is exposed to that impact its ability to both protect the casing and maintain zonal isolation. Mechanical properties include, but are not limited to, tensile strength, strain tolerance, flexural modulus, flexural strength.

"Flexural strain," as used herein, refers to the nominal fractional change in the length of an element of the outer surface of the test specimen at midspan, where the maximum strain occurs. Flexural strain is represented as a ratio. Flexural strain can also be referred to as "strain tolerance."

The term "flexural strength," as used herein, refers to the maximum bending stress that the test specimen can sustain before it yields.

"Flexural toughness," as used herein, is a measure of energy absorption capacity and characterization of material's ability to resist fracture under flexure loads.

As used in this disclosure, the term "subterranean formation" can refer to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region that is in fluid contact with the wellbore. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground that is in fluid contact with liquid or gaseous petroleum materials or water. In some embodiments, a subterranean formation is an oil well.

Epoxy Compositions Containing Sliding-Ring Polymers

Provided in this disclosure is an epoxy composition containing a thermally-curable epoxy resin, fumed silica, and a sliding-ring polymer additive. In some embodiments, the sliding-ring polymer additive is a sliding-ring polymer additive of the present disclosure. In some embodiments, the epoxy composition exhibits improved mechanical properties, for example, improved strain tolerance, improved flexural toughness, or combinations thereof, as compared to the same epoxy composition that does not contain the sliding-ring polymer additive. In some embodiments, the epoxy composition exhibits improved impact resistance as compared to the same epoxy composition that does not contain the sliding-ring polymer additive.

Sliding-Ring Polymer Additives

Sliding-ring polymers, or polyrotaxanes, are a class of supramolecules with mechanically interlocked molecular systems and functional ends. They consist of one or more rings and one or more strings, where the dissociation of a ring from a string is hindered by bulky groups (so-called stoppers) at both ends of the strings. In some embodiments, the ring compound is a cyclodextrin. Cyclodextrins (CDs) are a family of macrocyclic oligosaccharides, the most common of which are composed of 6 (α), 7 (β), or 8 (γ) α-1,4-linked D-glucopyranose units. CDs have amphiphilic properties, where the inside cavity of the CDs is hydrophobic, and the outside is hydrophilic because of all the hydroxyl groups located outward of the CDs. Owing to these mismatched characteristics in a cyclic molecule, CDs can be employed to form the host-guest assemblies.

A wide variety of less hydrophilic compounds can be accommodated in the cavity of CDs. The linear polymer chains, for example, polyethylene glycol, polypropylene glycol, or polysiloxanes, can be employed to generate host-guest complexes or inclusion complexes. Another important feature of inclusion complex formation is the selectivity based on the host-guest chemistry between backbone polymers and cyclic moieties. For example, polyethylene glycol yields pseudopolyrotaxanes with α-CD, while polypropylene glycol forms pseudopolyrotaxanes with β-CD. Likewise, bulkier polysiloxanes can generate inclusion complexes with γ-CD. This means that the optimal size fitting between the outside diameter of the backbone strings and the inside diameter of the rings is important in the formation of inclusion complex, which also supports the threading of CDs onto various backbone polymers.

In some embodiments, the reaction kinetics of the formation of inclusion complexes are assisted by the strong hydrogen bonds between adjacent ring-type compounds, such as cyclodextrins. This tends to yield a polyrotaxane of the full inclusion or filling ratio, where the backbone polymer is covered almost fully with cyclodextrins. In some embodiments, the filling ratio of polyrotaxane is dependent on the backbone polymer species, the length of the polymer string, the end groups of the string, the type and concentration of cyclodextrins, and the solvent and temperature during inclusion formation. In some embodiments, the cyclodextrins and linear polymers are dissolved in aqueous media that results in the formation of an inclusion complex or pseudopolyrotaxanes. Subsequent attachment of caps generates the polyrotaxanes (FIG. 1). In this structure, the movement and rotation of cyclic molecules can be possible upon external stimuli which facilitate the distribution of stresses within the materials, thereby restricting the molecular cleavage within the polymer networks.

Polyrotaxanes are distinct from traditional polymers and elastomeric additives. Traditional additives typically have a chemistry that is dependent upon strong covalent bonding while polyrotaxanes have both mechanical bonds and chemical bonds within polymeric networks. In traditional polymeric additives, chemical bonds/crosslinks break down upon repeated cycling of stresses due to the uneven distribution of the stresses. Since the stresses are concentrated on the shorter molecular chains, these chains lose strength effectiveness over a period of time. The polyrotaxane additives of the present disclosure contain pulley-like crosslinks in its polymeric network. The elegance of the pulley principle is demonstrated on the macroscopic scale by observing that the force required to lift an object directly and without a pulley is greater than the force required to lift the same object with a system of pulleys. The incorporation of molecular pulleys within this additive has an analogous effect.

Figure 2:
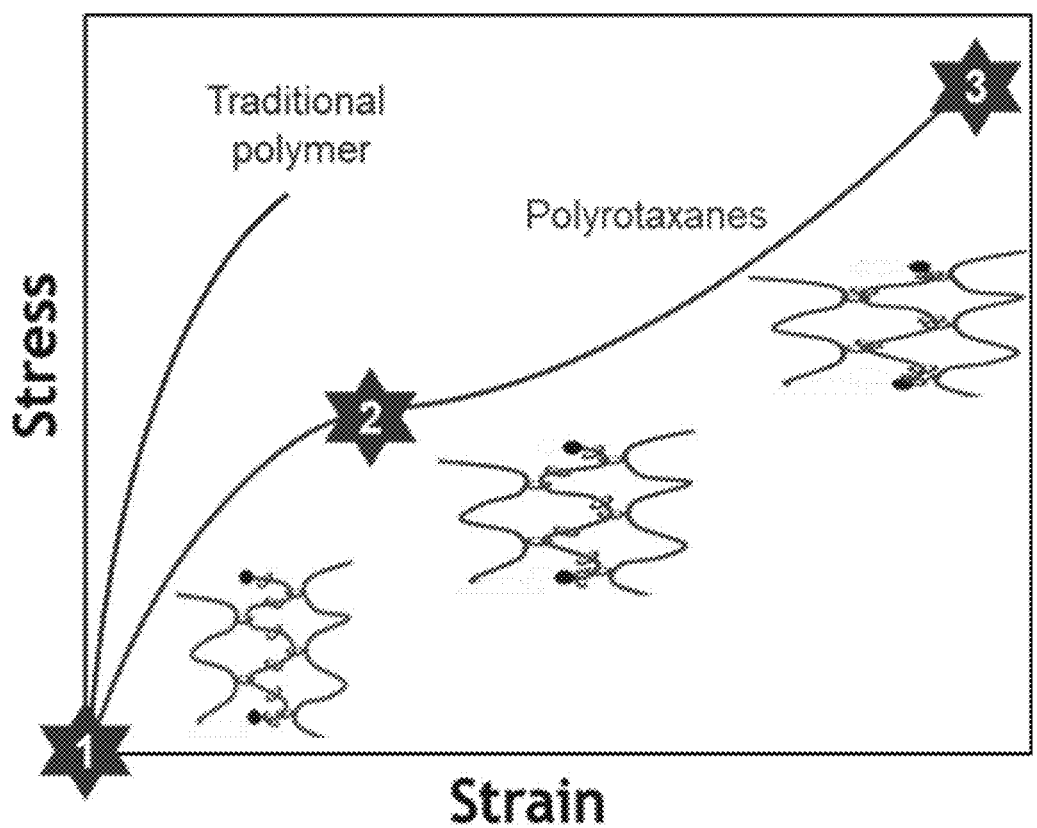
FIG. 2 shows a comparison of stress-strain curves of traditional polymer and polyrotaxane additives.

A comparison of solid-state properties of a traditional polymer and the polyrotaxane additives of the present disclosure is shown in FIG. 2, which is a stress-strain diagram of traditional polymers where yield point at a certain stress is defined. In the case of polyrotaxanes, two zones are observed—one that resembles traditional polymers and another that is distinctly different. The stress-strain curve between points 2 and 3 is similar to the stress-strain curve that is observed in artillery walls or spider silk. More than five-fold strain with the same amount of stress is observed in polyrotaxanes when compared with traditional polymers. A gram of this material is reinforced with many billions of molecular pulleys, which are designed to redistribute load. When forces are applied to this type of mechanically linked polymer network, the stress is not concentrated on short linkages; rather, it is uniformly distributed throughout the matrix. Thus, these sliding motions at the molecular level act as molecular machines in the matrix and enable unprecedented elastic behavior.

Provided in this disclosure are sliding-ring polymer additives that are made up of at least two molecules of a polyrotaxane that are cross-linked to each other through a chemical bond, where the polyrotaxane contains a linear polymer and at least one ring compound, where the linear polymer is threaded through the opening of the ring compound, and stopper groups disposed at both end terminals of the linear polymer. In some embodiments, at least one of the linear polymer and the ring compound is substituted with a hydrophobic or non-ionic group or combination thereof.

Any sliding-ring polymer known in the art can be used as an additive in the epoxy compositions of the present disclosure. For example, any sliding-ring polymer that improves the elastic properties of a polymeric matrix material, such as an epoxy resin, can be used. In some embodiments, the sliding-ring polymer additive is a sliding-ring polymer additive as described in the present disclosure, for example, a sliding-ring polymer additive that includes at least two molecules of a polyrotaxane that are made up of a linear polymer, at least one ring compound, and stopper groups disposed at the end terminals of the linear polymer. In some embodiments, the sliding-ring polymer additive is an additive or polyrotaxane moiety as described in any one of U.S. Pat. Nos. 7,612,142; 7,622,527; 7,799,867; 7,847,049; 7,893,168; 7,943,718; 7,981,943; 8,007,911; 8,450,415; 8,580,906; 9,068,051; and 9,266,972; each of which is incorporated by reference in its entirety.

Commercially available sliding-ring polymers can also be used in the epoxy compositions of the present disclosure. In some embodiments, the sliding-ring polymer additive is a sliding-ring polymer or polyrotaxane manufactured by Nagase America Corporation (New York, New York). Other examples of commercially available sliding-ring polymer additives are sliding-ring polymers or polyrotaxanes manufactured by Advanced Softmaterials Inc. (Chiba, Japan).

Linear Polymers

The linear polymer that can be included in a polyrotaxane can be any linear polymer that can be included in a ring compound such that the linear polymer is threaded through the opening of the ring compound. Any linear polymer that can be threaded through the opening of a ring compound can be included in a polyrotaxane. Examples of such linear polymers include those described in any one of U.S. Pat. Nos. 7,612,142; 7,622,527; 7,799,867; 7,847,049; 7,893,168; 7,943,718; 7,981,943; 8,007,911; 8,450,415; 8,580,906; 9,068,051; and 9,266,972; each of which is incorporated by reference in its entirety.

Examples of the suitable linear polymers include, but are not limited to, polyvinyl alcohol, polyvinylpyrrolidone, poly (meth)acrylic acid, cellulose-based resins (for example, carboxymethylcellulose, hydroxyethylcellulose, and hydroxypropylcellulose), polyacrylamide, polyethylene oxide, polyethylene glycol, polypropylene glycol, polyvinyl acetal-based resins, polyvinyl methyl ether, polyamine, polyethyleneimine, casein, gelatin, starch and copolymers thereof, polyolefin-based resins (for example, polyethylene, polypropylene, and copolymer resins with other olefinic monomers), polyester resins, polyvinyl chloride resins, polystyrene-based resins (for example, polystyrene and acrylonitrile-styrene copolymer resin), acrylic resins (for example, polymethyl methacrylate, copolymers of (meth) acrylate, acrylonitrile-methyl acrylate copolymer resin), polycarbonate resins, polyurethane resins, vinyl chloride-vinyl acetate copolymer resin, polyvinylbutyral resin, polyisobutylene, polytetrahydrofuran, polyaniline, acrylonitrile-butadiene-styrene copolymer (ABS resin), polyamides (for example, nylon), polyimides, polydienes (for example, polyisoprene and polybutadiene), polysiloxanes (for example, polydimethylsiloxane), polysulfones, polyimines, polyacetic anhydrides, polyureas, polysulfides, polyphosphazenes, polyketones, polyphenylenes, polyhaloolefins; and copolymer and derivatives thereof. In some embodiments, the linear polymer is selected from the group consisting of polypropylene glycol, polytetrahydrofuran, polydimethylsiloxane, polyethylene and polypropylene. In some embodiments, the linear polymer is polyethylene glycol. In some embodiments, the linear polymer is polypropylene glycol. In some embodiments, the linear polymer is a polysiloxane.

In some embodiments, the linear molecule has a molecular weight of about 2000 g/mol to about 50,000 g/mol, for example, about 2000 g/mol to about 45,000 g/mol, about 2000 g/mol to about 40,000 g/mol, about 2000 g/mol to about 35,000 g/mol, about 2000 g/mol to about 30,000 g/mol, about 2000 g/mol to about 25,000 g/mol, about 2000 g/mol to about 20,000 g/mol, about 2000 g/mol to about 15,000 g/mol, about 2000 g/mol to about 10,000 g/mol, about 2000 g/mol to about 8000 g/mol, about 2000 g/mol to about 5000 g/mol, about 5000 g/mol to about 50,000 g/mol, about 5000 g/mol to about 45,000 g/mol, about 5000 g/mol to about 40,000 g/mol, about 5000 g/mol to about 35,000 g/mol, about 5000 g/mol to about 30,000 g/mol, about 5000 g/mol to about 25,000 g/mol, about 5000 g/mol to about 20,000 g/mol, about 5000 g/mol to about 15,000 g/mol, about 5000 g/mol to about 10,000 g/mol, about 5000 g/mol to about 8000 g/mol, about 8000 g/mol to about 50,000 g/mol, about 8000 g/mol to about 45,000 g/mol, about 8000 g/mol to about 40,000 g/mol, about 8000 g/mol to about 35,000 g/mol, about 8000 g/mol to about 30,000 g/mol, about 8000 g/mol to about 25,000 g/mol, about 8000 g/mol to about 20,000 g/mol, about 8000 g/mol to about 15,000 g/mol, about 8000 g/mol to about 10,000 g/mol, about 10,000 g/mol to about 50,000 g/mol, about 10,000 g/mol to about 45,000 g/mol, about 10,000 g/mol to about 40,000 g/mol, about 10,000 g/mol to about 35,000 g/mol, about 10,000 g/mol to about 30,000 g/mol, about 10,000 g/mol to about 25,000 g/mol, about 10,000 g/mol to about 20,000 g/mol, about 10,000 g/mol to about 15,000 g/mol, about 15,000 g/mol to about 50,000 g/mol, about 15,000 g/mol to about 45,000 g/mol, about 15,000 g/mol to about 40,000 g/mol, about 15,000 g/mol to about 35,000 g/mol, about 15,000 g/mol to about 30,000 g/mol, about 15,000 g/mol to about 25,000 g/mol, about 15,000 g/mol to about 20,000 g/mol, about 20,000 g/mol to about 50,000 g/mol, about 20,000 g/mol to about 45,000 g/mol, about 20,000 g/mol to about 40,000 g/mol, about 20,000 g/mol to about 35,000 g/mol, about 20,000 g/mol to about 30,000 g/mol, about 20,000 g/mol to about 25,000 g/mol, about 25,000 g/mol to about 50,000 g/mol, about 25,000 g/mol to about 45,000 g/mol, about 25,000 g/mol to about 40,000 g/mol, about 25,000 g/mol to about 35,000 g/mol, about 25,000 g/mol to about 30,000 g/mol, about 30,000 g/mol to about 50,000 g/mol, about 30,000 g/mol to about 45,000 g/mol, about 30,000 g/mol to about 40,000 g/mol, about 30,000 g/mol to about 35,000 g/mol, about 35,000 g/mol to about 50,000 g/mol, about 35,000 g/mol to about 45,000 g/mol, about 35,000 g/mol to about 40,000 g/mol, about 40,000 g/mol to about 50,000 g/mol, about 40,000 g/mol to about 45,000 g/mol, about 45,000 g/mol to about 50,000 g/mol, or about 2000 g/mol, about 5000 g/mol, about 8000 g/mol, about 10,000 g/mol, about 15,000 g/mol, about 20,000 g/mol, about 25,000 g/mol, about 30,000 g/mol, about 35,000 g/mol, about 40,000 g/mol, about 45,000 g/mol, or about 50,000 g/mol. In some embodiments, the molecular weight of the linear molecule is about 2000 g/mol to about 50,000 g/mol. In some embodiments, the molecular weight of the linear molecule is about 8000 g/mol to about 30,000 g/mol. In some embodiments, the molecular weight of the linear molecule is about 15,000 g/mol to about 25,000 g/mol. In some embodiments, the molecular weight of the linear molecule is greater than about 10,000 g/mol. In some embodiments, the molecular weight of the linear molecule is greater than about 20,000 g/mol. In some embodiments, the molecular weight of the linear molecule is greater than about 35,000 g/mol.

Ring Compounds

The ring compound that can be included in a polyrotaxane can be any ring compound that allows for threading of a linear polymer through the opening of the ring. Examples of such ring compounds include those described in any one of U.S. Pat. Nos. 7,612,142; 7,622,527; 7,799,867; 7,847,049; 7,893,168; 7,943,718; 7,981,943; 8,007,911; 8,450,415; 8,580,906; 9,068,051; and 9,266,972; each of which is incorporated by reference in its entirety.

In some embodiments, the ring compound is a cyclodextrin or a cyclodextrin derivative. Examples of suitable ring compounds include, but are not limited to, α-cyclodextrin (α-CD), β-cyclodextrin (β-CD), γ-cyclodextrin (γ-CD), and derivatives thereof. Cyclodextrin derivatives are compounds obtained by substituting hydroxyl groups of cyclodextrin with polymer chains, substituents, or both. Examples of suitable polymer chains include, but are not limited to, polyethylene glycol, polypropylene glycol, polyethylene, polypropylene, polyvinyl alcohol, polyacrylate, polylactone, and polylactam. Examples of suitable substituents include, but are not limited to, hydroxyl, thionyl, amino, sulfonyl, phosphonyl, acetyl, alkyl groups (for example, methyl, ethyl, propyl, and isopropyl), trityl, tosyl, trimethylsilane, and phenyl.

Examples of suitable cyclodextrin and cyclodextrin derivatives include, but are not limited to, α-cyclodextrin (the number of glucose residues=6, inner diameter of opening=about 0.45 to 0.6 μm), β-cyclodextrin (the number of glucose residues=7, inner diameter of opening=about 0.6 to 0.8 μm), γ-cyclodextrin (the number of glucose residues=8, inner diameter of opening=about 0.8 to 0.95 μm), dimethyl cyclodextrin, glucosyl cyclodextrin, 2-hydroxypropyl-α-cyclodextrin, 2,6-di-O-methyl-α-cyclodextrin 6-O-α-maltosyl-α-cyclodextrin, 6-O-α-D-glucosyl-α-cyclodextrin, hexakis(2,3,6-tri-O-acetyl)-α-cyclodextrin, hexakis(2,3,6-tri-O-methyl)-α-cyclodextrin, hexakis(6-O-tosyl)-α-cyclodextrin, hexakis(6-amino-6-deoxy)-α-cyclodextrin, hexakis(2,3-acetyl-6-bromo-6-deoxy)-α-cyclodextrin, hexakis(2,3,6-tri-O-octyl)-α-cyclodextrin, mono(2-O-phosphoryl)-α-cyclodextrin, mono[2,(3)-O-(carboxylmethyl)]-α-cyclodextrin, octakis(6-O-t-butyldimethylsilyl)-α-cyclodextrin, succinyl-α-cyclodextrin, glucuronyl glucosyl-β-cyclodextrin, heptakis (2,6-di-O-methyl)-β-cyclodextrin, heptakis(2,6-di-O-ethyl)-β-cyclodextrin, heptakis(6-O-sulfo)-β-cyclodextrin, heptakis(2,3-di-O-acetyl-6-O-sulfo)β-cyclodextrin, heptakis(2,3-di-O-methyl-6-O-sulfo)-β-cyclodextrin, heptakis(2,3,6-tri-O-acetyl)-β-cyclodextrin, heptakis(2,3,6-tri-O-benzoyl)-β-cyclodextrin, heptakis(2,3,6-tri-O-methyl)β-cyclodextrin, heptakis(3-O-acetyl-2,6-di-O-methyl)-β-cyclodextrin, heptakis(2,3-O-acetyl-6-bromo-6-deoxy)-β-cyclodextrin, 2-hydroxyethyl-β-cyclodextrin, hydroxypropyl-β-cyclodextrin, 2-hydroxypropyl-β-cyclodextrin, (2-hydroxy-3-N,N,N-trimethylamino)propyl-β-cyclodextrin, 6-O-α-maltosyl-β-cyclodextrin, methyl-β-cyclodextrin, hexakis(6-amino-6-deoxy)-β-cyclodextrin, bis(6-azido-6-deoxy)-β-cyclodextrin, mono(2-O-phosphoryl)-β-cyclodextrin, hexakis[6-deoxy-6-(1-imidazolyl)]-β-cyclodextrin, monoacetyl-β-cyclodextrin, triacetyl-β-cyclodextrin, monochlorotriazinyl-β-cyclodextrin, 6-O-α-D-glucosyl-β-cyclodextrin, 6-O-α-D-maltosyl-β-cyclodextrin, succinyl-β-cyclodextrin, succinyl-(2-hydroxypropyl)β-cyclodextrin, 2-carboxymethyl-β-cyclodextrin, 2-carboxyethyl-β-cyclodextrin, butyl-β-cyclodextrin, sulfopropyl-β-cyclodextrin, 6-monodeoxy-6-monoamino-β-cyclodextrin, silyl[(6-O-t-butyldimethyl)2,3-di-O-acetyl]-β-cyclodextrin, 2-hydroxyethyl-γ-cyclodextrin, 2-hydroxypropyl-γ-cyclodextrin, butyl-γ-cyclodextrin, 3A-amino-3A-deoxy-(2AS,3AS)-γ-cyclodextrin, mono-2-O-(p-toluenesulfonyl)-γ-cyclodextrin, mono-6-O-(p-toluenesulfonyl)-γ-cyclodextrin, mono-6-O-mesitylenesulfonyl-γ-cyclodextrin, octakis(2,3,6-tri-O-methyl)-γ-cyclodextrin, octakis(2,6-di-O-phenyl)-γ-cyclodextrin, octakis(6-O-t-butyldimethylsilyl)-γ-cyclodextrin, and octakis(2,3,6-tri-O-acetyl)-γ-cyclodextrin. The ring compounds, such as the cyclodextrins listed in the present disclosure, can be used alone or in combination of two or more.

Figure 3A:
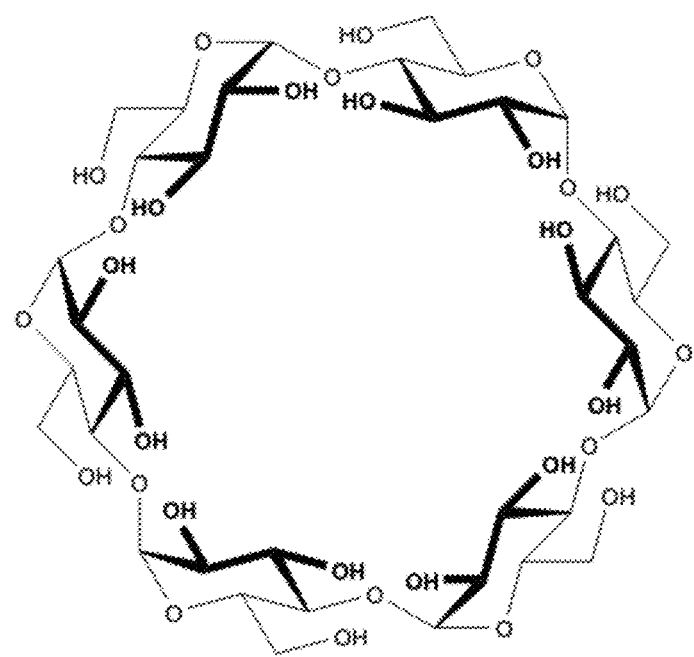
FIGS. 3A-3C depict the structures of exemplary cyclodextrin compounds α-cyclodextrin (α-CD.
Figure 3B:
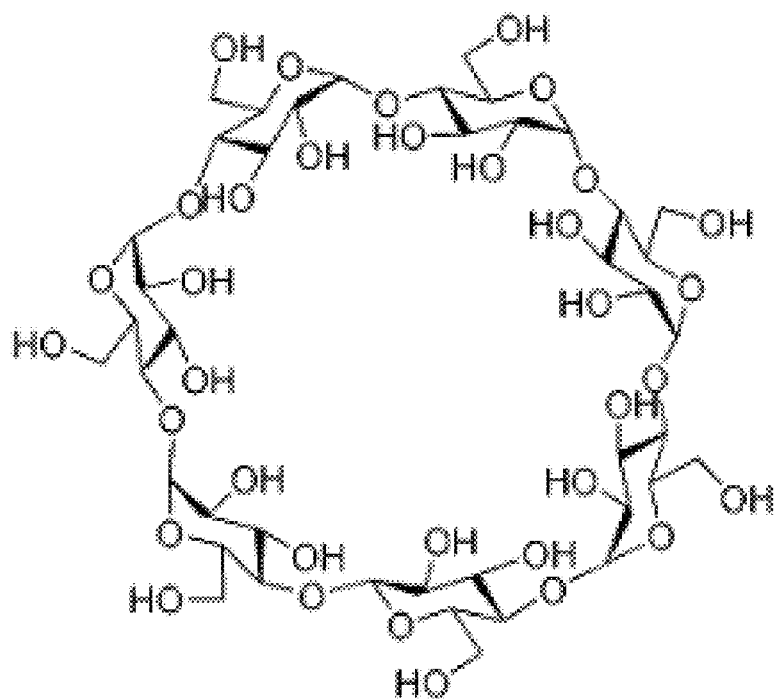
Figure 3C:
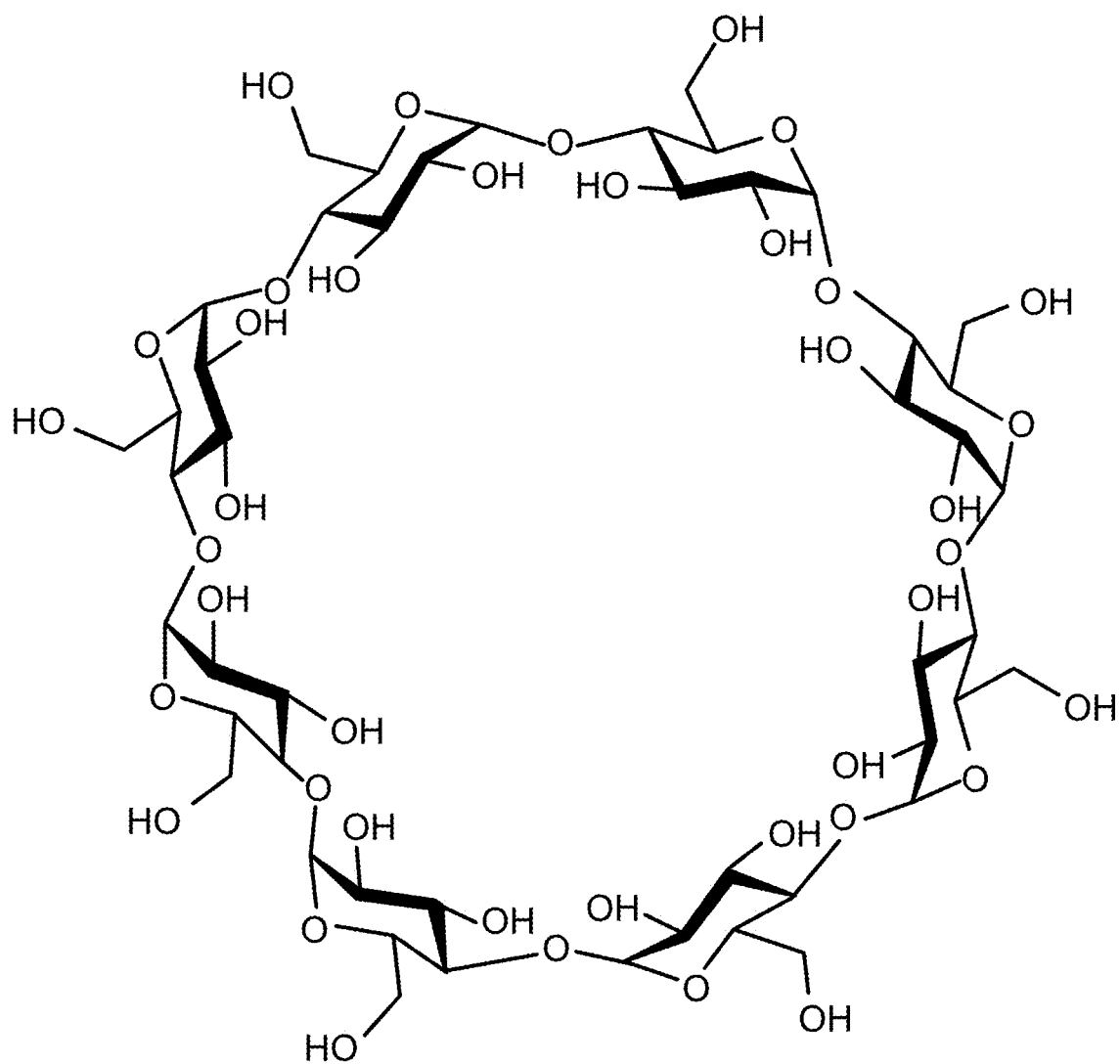

In some embodiments, the ring compound is α-cyclodextrin having the structure shown in FIG. 3A. In some embodiments, the ring compound is β-cyclodextrin having the structure shown in FIG. 3B. In some embodiments, the ring compound is γ-cyclodextrin having the structure shown in FIG. 3C.

In some embodiments, the amount of ring compound, for example, a cyclodextrin or cyclodextrin derivative, on the polymer chain is about 2 wt % to about 60 wt %, such as about 2 wt % to about 55 wt %, about 2 wt % to about 50 wt %, about 2 wt % to about 45 wt %, about 2 wt % to about 40 wt %, about 2 wt % to about 35 wt %, about 2 wt % to about 30 wt %, about 2 wt % to about 25 wt %, about 2 wt % to about 20 wt %, about 2 wt % to about 15 wt %, about 2 wt % to about 10 wt %, about 2 wt % to about 5 wt %, about 5 wt % to about 60 wt %, about 5 wt % to about 55 wt %, about 5 wt % to about 50 wt %, about 5 wt % to about 45 wt %, about 5 wt % to about 40 wt %, about 5 wt % to about 35 wt %, about 5 wt % to about 30 wt %, about 5 wt % to about 25 wt %, about 5 wt % to about 20 wt %, 5 wt % to about 15 wt %, about 5 wt % to about 10 wt %, about 10 wt % to about 60 wt %, about 10 wt % to about 55 wt %, about 10 wt % to about 50 wt %, about 10 wt % to about 45 wt %, about 10 wt % to about 40 wt %, about 10 wt % to about 35 wt %, about 10 wt % to about 30 wt %, about 10 wt % to about 25 wt %, about 10 wt % to about 20 wt %, about 10 wt % to about 15 wt %, about 15 wt % to about 60 wt %, about 15 wt % to about 55 wt %, about 15 wt % to about 50 wt %, about 15 wt % to about 45 wt %, about 15 wt % to about 40 wt %, about 15 wt % to about 35 wt %, about 15 wt % to about 30 wt %, about 15 wt % to about 25 wt %, about 15 wt % to about 20 wt %, about 20 wt % to about 60 wt %, about 20 wt % to about 55 wt %, about 20 wt % to about 50 wt %, about 20 wt % to about 45 wt %, about 20 wt % to about 40 wt %, about 20 wt % to about 35 wt %, about 20 wt % to about 30 wt %, about 20 wt % to about 25 wt %, about 25 wt % to about 60 wt %, about 25 wt % to about 55 wt %, about 25 wt % to about 50 wt %, about 25 wt % to about 45 wt %, about 25 wt % to about 40 wt %, about 25 wt % to about 35 wt %, about 25 wt % to about 30 wt %, about 30 wt % to about 60 wt %, about 30 wt % to about 55 wt %, about 30 wt % to about 50 wt %, about 30 wt % to about 45 wt %, about 30 wt % to about 40 wt %, about 30 wt % to about 35 wt %, about 35 wt % to about 60 wt %, about 35 wt % to about 55 wt %, about 35 wt % to about 50 wt %, about 35 wt % to about 45 wt %, about 35 wt % to about 40 wt %, about 40 wt % to about 60 wt %, about 40 wt % to about 55 wt %, about 40 wt % to about 50 wt %, about 40 wt % to about 45 wt %, about 45 wt % to about 60 wt %, about 45 wt % to about 55 wt %, about 45 wt % to about 50 wt %, about 50 wt % to about 60 wt %, about 50 wt % to about 55 wt %, about 55 wt % to about 60 wt %, or about 2 wt %, about 5 wt %, about 10 wt %, about 15 wt %, about 20 wt %, about 25 wt %, about 30 wt %, about 35 wt %, about 40 wt %, about 45 wt %, about 50 wt %, about 55 wt %, or about 60 wt %. In some embodiments, the amount of ring compound, for example, a cyclodextrin or cyclodextrin derivative, on the polymer chain is about 2 wt % to about 60 wt %. In some embodiments, the amount of ring compound, for example, a cyclodextrin or cyclodextrin derivative, on the polymer chain is about 10 wt % to about 50 wt %. In some embodiments, the amount of ring compound, for example, a cyclodextrin or cyclodextrin derivative, on the polymer chain is about 25 wt % to about 35 wt %.

Hydrophobic and Non-Ionic Groups

In some embodiments, at least one of the linear polymer and the ring compound is substituted (or modified) with a hydrophobic group or a non-ionic group or a combination thereof. The hydrophobic and non-ionic groups can be any group that can modify or be substituted onto a linear polymer or ring compound. Examples of such groups include those described in any one of U.S. Pat. Nos. 7,612,142; 7,622,527; 7,799,867; 7,847,049; 7,893,168; 7,943,718; 7,981,943; 8,007,911; 8,450,415; 8,580,906; 9,068,051; and 9,266,972; each of which is incorporated by reference in its entirety.

In some embodiments, at least one of the linear polymer and ring compound is substituted with a hydrophobic group. Examples of suitable hydrophobic groups include, but are not limited to, alkyl group, benzyl group, benzene derivative-containing group, acyl group, silyl group, trityl group, tosyl group, a polymer, and groups bonded through a urethane bond, ester bond or ether bond. In some embodiments, the polymer is a polycaprolactone.

In some embodiments, at least one of the linear polymer and ring compound is substituted with a non-ionic group. In some embodiments, the non-ionic group is selected from the group consisting of: an —OR group, wherein R is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons; an —O—R'—X group, wherein R' is a group resulting from removal of one hydrogen in a linear or branched alkyl group having 1-12 carbons, a group resulting from removal of one hydrogen in a linear or branched alkyl group having 2-12 carbons and at least one ether group, a group resulting from removal of one hydrogen in a cycloalkyl group having 3-12 carbons, a group resulting from removal of one hydrogen in a cycloalkyl ether group having 2-12 carbons or a group resulting from removal of one hydrogen in a cycloalkyl thioether group having 2-12 carbons, and X is —OH, —NH$_2$ or —SH; an —O—CO—NH—R$^1$ group, wherein R$^1$ is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons; an —O—CO—R$^2$ group, wherein R$^2$ is a linear or branched alky 1 group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons; an —O—Si—R$^3$ group, wherein R$^3$ is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons; and an —O—CO—O—R$^4$ group, wherein R$^4$ is a linear or branched alkyl group having 1-12 carbons, a linear or branched alkyl group having 2-12 carbons and at least one ether group, a cycloalkyl group having 3-12 carbons, a cycloalkyl ether group having 2-12 carbons or a cycloalkyl thioether group having 2-12 carbons.

In some embodiments, R is selected from acrylate, methacrylate, amine, thiol, isocyanate, azide, hydroxyl, hydrogen, styrene, and combinations thereof.

Examples of R, R', R$^2$, R$^3$, and R$^4$ groups include, but are not limited to, alkyl groups such as methyl, ethyl, propyl, butyl, pentyl, hexyl, heptyl, octyl, nonyl, decyl, undecyl, and dodecyl; branched alkyl groups such as isopropyl, isobutyl, tert-butyl, 1-methylpropyl, isoamyl, neopentyl, 1,1-dimethylpropyl, 4-methylpentyl, 2-methylbutyl, and 2-ethylhexyl; cycloalkyl groups such as cyclopropyl, cyclobutyl, cyclopentyl, cyclohexyl, cycloheptyl, cyclooctyl, and adamantyl; cycloalkyl ether groups such as ethylene oxide, oxetane, tetrahydrofuran, tetrahydropyrane, oxepane, dioxane, and dioxolane; and cycloalkyl thioether groups such as thiirane, thietane, tetrahydrothiophene, thiane, dithiolane, and dithiane. In some embodiments, R' is a group resulting from removal of one hydrogen, for example, R' can be a group resulting from removal of one hydrogen in methyl, ethyl, propyl, butyl, pentyl or hexyl.

In some embodiments, the ring compound is substituted with a hydrophobic group, a non-ionic group, or combinations thereof. In some embodiments, the ring compound is a cyclodextrin. In some embodiments, a part or all of the hydroxyl groups (—OH) of the cyclodextrin are substituted with a hydrophobic group or non-ionic group or combination thereof. In some embodiments, a part or all of the hydroxyl groups (—OH) of the cyclodextrin are substituted with a polycaprolactone, a hydroxypropyl group, or both. In some embodiments, substitution of the hydroxyl group with the hydrophobic group or non-ionic group or combination thereof is about 10% to about 100% of the total hydroxyl groups of the total cyclodextrin molecules.

Amount of Inclusion

In some embodiments, where a plurality of ring compounds include a linear polymer such that the linear polymer is threaded through the ring compounds, when the maximum amount of inclusion of one linear polymer in the ring compound is 1, the ring compounds can include the linear polymer in an amount of 0.001 to 0.6, such as 0.01 to 0.5, or 0.05 to 0.4.

The maximum amount of inclusion in the ring compounds can be calculated from the length of the linear polymer and the thickness of the ring compounds. For example, when the linear polymer is polyethylene glycol and the ring compounds are α-cyclodextrin molecules, the maximum amount of inclusion has been experimentally determined (see, for example, Macromolecules (1993) 26:5698-5703).

Stopper Group

The polyrotaxane of the sliding-ring polymer includes stopper groups disposed at both end terminals of the linear polymer. The stopper groups can be any group that is disposed at the ends of a linear polymer and acts to prevent separation of the ring compounds. Examples of such stopper groups include those described in any one of U.S. Pat. Nos. 7,612,142; 7,622,527; 7,799,867; 7,847,049; 7,893,168; 7,943,718; 7,981,943; 8,007,911; 8,450,415; 8,580,906; 9,068,051; and 9,266,972; each of which is incorporated by reference in its entirety.

Examples of suitable stopper groups include, but are not limited to, dinitrophenyl groups; cyclodextrins; adamantane groups; trityl groups; fluoresceins; pyrenes; benzenes optionally substituted with one or more substituents including, but not limited to, alkyl, alkyloxy, hydroxy, halogen, cyano, sulfonyl, carboxyl, amino, and phenyl; polycyclic aromatics optionally substituted with one or more substituents including, but not limited to, alkyl, alkyloxy, hydroxy, halogen, cyano, sulfonyl, carboxyl, amino, and phenyl; and steroids. In some embodiments, the stopper group is selected from the group consisting of dinitrophenyl groups; cyclodextrins; adamantane groups; trityl groups; fluoresceins; and pyrenes. In some embodiments, the stopper group is adamantane. In some embodiments, the stopper group is trityl.

Cross-Linkers

In some embodiments, at least two molecules of polyrotaxane are chemically bonded by a cross-linking agent. Examples of suitable cross-linking agents include those described in any one of U.S. Pat. Nos. 7,612,142; 7,622,527; 7,799,867; 7,847,049; 7,893,168; 7,943,718; 7,981,943; 8,007,911; 8,450,415; 8,580,906; 9,068,051; and 9,266,972; each of which is incorporated by reference in its entirety.

Examples of suitable cross-linkers include, but are not limited to, melamine resins, polyisocyanate compounds, block isocyanate compounds, cyanuric chloride, trimesoyl chloride, terephthaloyl chloride, epichlorohydrin, dibromobenzene, formaldehyde, glutaraldehyde, phenylenediisocyanate, tolylene diisocyanate, divinylsulfone, bisphenol A diglycidyl ether, diisopropylethylenediamine, 1,1-carbonyldiimidazole, and alkoxy silanes. The cross-linkers can be used alone or in combination. In some embodiments, the cross-linker is selected from the group consisting of cyanuric chloride, trimesoyl chloride, terephthaloyl chloride, epichlorohydrin, dibromobenzene, glutaraldehyde, phenylene diisocyanates, tolylene diisocyanates, divinylsulfone, 1,1'-carbonyldiimidazole, and alkoxysilanes.

Linked Polyrotaxanes

In some embodiments of the sliding-ring polymer additives that can be used in the epoxy compositions of the present disclosure, at least two molecules of polyrotaxane are cross-linked to each other through a chemical bond. When linking polyrotaxane molecules, all of the polyrotaxane molecules can be substituted with the same hydrophobic or non-ionic group. Alternatively, a part of the polyrotaxane molecules can be substituted with one hydrophobic or non-ionic group, and the rest of the polyrotaxane molecules can be substituted with a hydrophobic or non-ionic group that is different from the first group. In some embodiments, different molecules of polyrotaxane substituted with different hydrophobic or non-ionic groups can be physically linked.

In some embodiments, at least one hydroxyl group of at least one cyclic molecule in each of at least two molecules of polyrotaxane is involved in cross-linking. In some embodiments, at least two molecules of polyrotaxane are chemically bonded by a cross-linking agent.

Epoxy Resin

The epoxy compositions of the present application contain an epoxy resin. Epoxies are known for their exceptional mechanical properties for structural applications, but are rigid and brittle materials. In some embodiments, addition of the sliding-ring polymer additive of the present disclosure increases the flexural toughness of the epoxy resin. In some embodiments, addition of the sliding-ring polymer additive of the present disclosure increases the strain tolerance of the epoxy resin. In some embodiments, addition of the sliding-ring polymer additive of the present disclosure increases the impact resistance of the epoxy resin. In some embodiments, the epoxy resin is a thermally-curable epoxy resin. Any epoxy resin having epoxide groups can be employed as a thermally-curable resin. Any thermally-curable epoxy resin can be used in the epoxy compositions of the present disclosure. In some embodiments, the epoxy resin has aliphatic groups, aromatic groups, or a mixture thereof. An exemplary epoxy resin is EPON™ Resin 826, a low viscosity, light colored liquid bisphenol A based epoxy resin sold by Hexion Inc., Columbus, OH Fumed Silica The epoxy compositions of the present disclosure contain fumed silica. Fumed silica is a form of amorphous silica and is also known as pyrogenic silica. Any known fumed silica can be used in the epoxy compositions of the present disclosure. An exemplary fumed silica is a fumed silica with a powdered particle size of 200-300 nm, sold by Sigma-Aldrich, St. Louis, MO Additives The epoxy compositions of the present disclosure can contain one or more additives. In some embodiments, the additive is a curing agent. Exemplary curing agents include etheramines and aliphatic and/or aromatic diamines, triamines, tetraamines, or mixtures thereof. An exemplary curing agent is JEFFAMINE® D-230 polyetheramine, a difunctional, primary amine with an average molecular weight of about 230 characterized by repeating oxypropylene units in the backbone, sold by Huntsman Corporation, The Woodlands, TX Epoxy Composition The epoxy compositions of the present application contain a thermally-curable epoxy resin, fumed silica, and a sliding-ring polymer additive. In some embodiments, the epoxy compositions contain one or more additives. In some embodiments, the epoxy compositions contain a curing agent.

In some embodiments, the amount of thermally-curable epoxy resin in the epoxy composition is about 50 wt % to about 95 wt %, such as about 50 wt % to about 90 wt %, about 50 wt % to about 85 wt %, about 50 wt % to about 80 wt %, about 50 wt % to about 75 wt %, about 50 wt % to about 70 wt %, about 50 wt % to about 65 wt %, about 50 wt % to about 60 wt %, about 50 wt % to about 55 wt %, about 55 wt % to about 95 wt %, about 55 wt % to about 90 wt %, about 55 wt % to about 85 wt %, about 55 wt % to about 80 wt %, about 55 wt % to about 75 wt %, about 55 wt % to about 70 wt %, about 55 wt % to about 65 wt %, about 55 wt % to about 60 wt %, about 60 wt % to about 95 wt %, about 60 wt % to about 90 wt %, about 60 wt % to about 85 wt %, about 60 wt % to about 80 wt %, about 60 wt % to about 75 wt %, about 60 wt % to about 70 wt %, about 60 wt % to about 65 wt %, about 65 wt % to about 95 wt %, about 65 wt % to about 90 wt %, about 65 wt % to about 85 wt %, about 65 wt % to about 80 wt %, about 65 wt % to about 75 wt %, about 65 wt % to about 70 wt %, about 70 wt % to about 95 wt %, about 70 wt % to about 90 wt %, about 70 wt % to about 85 wt %, about 70 wt % to about 80 wt %, about 70 wt % to about 75 wt %, about 75 wt % to about 95 wt %, about 75 wt % to about 90 wt %, about 75 wt % to about 85 wt %, about 75 wt % to about 80 wt %, about 80 wt % to about 95 wt %, about 80 wt % to about 90 wt %, about 80 wt % to about 85 wt %, about 85 wt % to about 95 wt %, about 85 wt % to about 90 wt %, about 90 wt % to about 95 wt %, or about 50 wt %, about 55 wt %, about 60 wt %, about 65 wt %, about 70 wt %, about 75 wt %, about 80 wt %, about 85 wt %, about 90 wt %, or about 95 wt %. In some embodiments, the amount of thermally-curable epoxy resin in the epoxy composition is about 50 wt % to about 95 wt %. In some embodiments, the amount of thermally-curable epoxy resin in the epoxy composition is about 60 wt % to about 90 wt %. In some embodiments, the amount of thermally-curable epoxy resin in the epoxy composition is about 75 wt % to about 85 wt %. In some embodiments, the amount of thermally-curable epoxy resin in the epoxy composition is about 65 wt %. In some embodiments, the amount of thermally-curable epoxy resin in the epoxy composition is about 70 wt %. In some embodiments, the amount of thermally-curable epoxy resin in the epoxy composition is about 75 wt %. An exemplary epoxy resin is EPON™ Resin 826 (a low viscosity, light colored liquid bisphenol A based epoxy resin sold by Hexion Inc., Columbus, OH).

In some embodiments, the amount of sliding-ring polymer additive in the epoxy composition is about 1 wt % to about 25 wt %, such as about 1 wt % to about 20 wt %, about 1 wt % to about 15 wt %, about 1 wt % to about 10 wt %, about 1 wt % to about 5 wt %, about 5 wt % to about 25 wt %, about 5 wt % to about 20 wt %, about 5 wt % to about 15 wt %, about 5 wt % to about 10 wt %, about 10 wt % to about 25 wt %, about 10 wt % to about 20 wt %, about 10 wt % to about 15 wt %, about 15 wt % to about 25 wt %, about 15 wt % to about 20 wt %, about 20 wt % to about 25 wt %, or about 1 wt %, about 5 wt %, about 10 wt %, about 15 wt %, about 20 wt %, or about 25 wt %. In some embodiments, the amount of sliding-ring polymer additive in the epoxy composition is about 1 wt % to about 25 wt %. In some embodiments, the amount of sliding-ring polymer additive in the epoxy composition is about 5 wt % to about 20 wt %. In some embodiments, the amount of sliding-ring polymer additive in the epoxy composition is about 10 wt % to about 15 wt %. In some embodiments, the amount of sliding-ring polymer additive in the epoxy composition is about 10 wt %. In some embodiments, the sliding-ring polymer additive is a cross-linked polyrotaxane bead. An exemplary cross-linked polyrotaxane bead is the one sold by Advanced Softmaterials (Japan).

In some embodiments, the amount of fumed silica in the epoxy composition is about 1 wt % to about 25 wt %, such as about 1 wt % to about 20 wt %, about 1 wt % to about 15 wt %, about 1 wt % to about 10 wt %, about 1 wt % to about 5 wt %, about 5 wt % to about 25 wt %, about 5 wt % to about 20 wt %, about 5 wt % to about 15 wt %, about 5 wt % to about 10 wt %, about 10 wt % to about 25 wt %, about 10 wt % to about 20 wt %, about 10 wt % to about 15 wt %, about 15 wt % to about 25 wt %, about 15 wt % to about 20 wt %, about 20 wt % to about 25 wt %, or about 1 wt %, about 2.5 wt %, about 5 wt %, about 7.5 wt %, about 10 wt %, about 12.5 wt %, about 15 wt %, about 17.5 wt %, about 20 wt %, about 22.5 wt %, or about 25 wt %. In some embodiments, the amount of fumed silica in the epoxy composition is about 1 wt % to about 10 wt %. In some embodiments, the amount of fumed silica in the epoxy composition is about 5 wt % to about 15 wt %. In some embodiments, the amount of fumed silica in the epoxy composition is about 5 wt % to about 10 wt %. In some embodiments, the amount of fumed silica in the epoxy composition is about 7.5 wt %.

In some embodiments, the epoxy composition contains an additive. In some embodiments, the additive is a curing agent. In some embodiments, the amount of additive in the epoxy composition is about 5 wt % to about 30 wt %, about 5 wt % to about 25 wt %, about 5 wt % to about 20 wt %, about 5 wt % to about 15 wt %, about 5 wt % to about 10 wt %, about 10 wt % to about 30 wt %, about 10 wt % to about 25 wt %, about 10 wt % to about 20 wt %, about 10 wt % to about 15 wt %, about 15 wt % to about 30 wt %, about 15 wt % to about 25 wt %, about 15 wt % to about 20 wt %, about 20 wt % to about 30 wt %, about 20 wt % to about 25 wt %, about 25 wt % to about 30 wt %, or about 5 wt %, about 10 wt %, about 15 wt %, about 20 wt %, about 25 wt %, or about 30 wt %. In some embodiments, the amount of additive in the epoxy composition is about 5 wt % to about 30 wt %. In some embodiments, the amount of additive in the epoxy composition is about 10 wt % to about 25 wt %. In some embodiments, the amount of additive in the epoxy composition is about 15 wt % to about 20 wt %. In some embodiments, the amount of additive in the epoxy composition is about 22 wt %. In some embodiments, the amount of additive in the epoxy composition is about 23 wt %. In some embodiments, the amount of additive in the epoxy composition is about 25 wt %. In some embodiments, the additive is a polyetheramine. An exemplary polyetheramine is JEFFAMINE® D-230 polyetheramine (a difunctional, primary amine with an average molecular weight of about 230 characterized by repeating oxypropylene units in the backbone, sold by Huntsman Corporation, The Woodlands, TX).

In some embodiments, the thermally-curable epoxy resin and the curing agent are present in a ratio of about 75:25, or about 70:30, or about 65:35, or about 60:40, or about 80:20, or about 85:15. In some embodiments, the thermally-curable epoxy resin and the curing agent are present in a ratio of about 75:25.

3D-Printed Epoxy Composition

In some embodiments, the epoxy compositions of the present disclosure that contain a thermally-curable epoxy resin, fumed silica, and a sliding-ring polymer additive are 3D-printed. In some embodiments, the 3D-printed epoxy compositions contain one or more additives.

In some embodiments, the amount of thermally-curable epoxy resin in the 3D-printed epoxy composition is about 55 wt % to about 95 wt %, such as about 55 wt % to about 90 wt %, about 55 wt % to about 85 wt %, about 55 wt % to about 80 wt %, about 55 wt % to about 75 wt %, about 55 wt % to about 70 wt %, about 55 wt % to about 65 wt %, about 55 wt % to about 60 wt %, about 60 wt % to about 95 wt %, about 60 wt % to about 90 wt %, about 60 wt % to about 85 wt %, about 60 wt % to about 80 wt %, about 60 wt % to about 75 wt %, about 60 wt % to about 70 wt %, about 60 wt % to about 65 wt %, about 65 wt % to about 95 wt %, about 65 wt % to about 90 wt %, about 65 wt % to about 85 wt %, about 65 wt % to about 80 wt %, about 65 wt % to about 75 wt %, about 65 wt % to about 70 wt %, about 70 wt % to about 95 wt %, about 70 wt % to about 90 wt %, about 70 wt % to about 85 wt %, about 70 wt % to about 80 wt %, about 70 wt % to about 75 wt %, about 75 wt % to about 95 wt %, about 75 wt % to about 90 wt %, about 75 wt % to about 85 wt %, about 75 wt % to about 80 wt %, about 80 wt % to about 95 wt %, about 80 wt % to about 90 wt %, about 80 wt % to about 85 wt %, about 85 wt % to about 95 wt %, about 85 wt % to about 90 wt %, about 90 wt % to about 95 wt %, or about 55 wt %, about 60 wt %, about 65 wt %, about 70 wt %, about 75 wt %, about 80 wt %, about 85 wt %, about 90 wt %, or about 95 wt %. In some embodiments, the amount of thermally-curable epoxy resin in the 3D-printed epoxy composition is about 55 wt % to about 95 wt %. In some embodiments, the amount of thermally-curable epoxy resin in the 3D-printed epoxy composition is about 65 wt % to about 90 wt %. In some embodiments, the amount of thermally-curable epoxy resin in the 3D-printed epoxy composition is about 80 wt % to about 85 wt %. In some embodiments, the amount of thermally-curable epoxy resin in the 3D-printed epoxy composition is about 83 wt %. In some embodiments, the amount of thermally-curable epoxy resin in the 3D-printed epoxy composition is about 85 wt %.

In some embodiments, the amount of sliding-ring polymer additive in the 3D-printed epoxy composition is about 1 wt % to about 15 wt %, such as about 1 wt % to about 12 wt %, about 1 wt % to about 10 wt %, about 1 wt % to about 7.5 wt %, about 1 wt % to about 5 wt %, about 1 wt % to about 2.5 wt %, about 2.5 wt % to about 15 wt %, about 2.5 wt % to about 12 wt %, about 2.5 wt % to about 10 wt %, about 2.5 wt % to about 7.5 wt %, about 2.5 wt % to about 5 wt %, about 5 wt % to about 15 wt %, about 5 wt % to about 12 wt %, about 5 wt % to about 10 wt %, about 5 wt % to about 7.5 wt %, about 7.5 wt % to about 15 wt %, about 7.5 wt % to about 10 wt %, about 10 wt % to about 15 wt %, about 10 wt % to about 12 wt %, about 12 wt % to about 15 wt %, or about 1 wt %, about 2.5 wt %, about 5 wt %, about 7.5 wt %, about 10 wt %, about 12 wt %, or about 15 wt %. In some embodiments, the amount of sliding-ring polymer additive in the 3D-printed epoxy composition is about 1 wt % to about 25 wt %. In some embodiments, the amount of sliding-ring polymer additive in the 3D-printed epoxy composition is about 5 wt % to about 20 wt %. In some embodiments, the amount of sliding-ring polymer additive in the 3D-printed epoxy composition is about 10 wt % to about 15 wt %. In some embodiments, the amount of sliding-ring polymer additive in the 3D-printed epoxy composition is about 2.5 wt %. In some embodiments, the sliding-ring polymer additive is a cross-linked polyrotaxane bead. An exemplary cross-linked polyrotaxane bead is the one sold by Advanced Softmaterials (Japan). In some embodiments, the cross-linked polyrotaxane bead is surface-functionalized with epoxide rings.

In some embodiments, the amount of fumed silica in the 3D-printed epoxy composition is about 1 wt % to about 25 wt %, such as about 1 wt % to about 20 wt %, about 1 wt % to about 15 wt %, about 1 wt % to about 10 wt %, about 1 wt % to about 5 wt %, about 5 wt % to about 25 wt %, about 5 wt % to about 20 wt %, about 5 wt % to about 15 wt %, about 5 wt % to about 10 wt %, about 10 wt % to about 25 wt %, about 10 wt % to about 20 wt %, about 10 wt % to about 15 wt %, about 15 wt % to about 25 wt %, about 15 wt % to about 20 wt %, about 20 wt % to about 25 wt %, or about 1 wt %, about 2.5 wt %, about 5 wt %, about 7.5 wt %, about 10 wt %, about 12.5 wt %, about 15 wt %, about 17.5 wt %, about 20 wt %, about 22.5 wt %, or about 25 wt %. In some embodiments, the amount of fumed silica in the 3D-printed epoxy composition is about 1 wt % to about 10 wt %. In some embodiments, the amount of fumed silica in the 3D-printed epoxy composition is about 5 wt % to about 15 wt %. In some embodiments, the amount of fumed silica in the 3D-printed epoxy composition is about 5 wt % to about 10 wt %. In some embodiments, the amount of fumed silica in the 3D-printed epoxy composition is about 7.5 wt %.

In some embodiments, the 3D-printed epoxy composition contains an additive. In some embodiments, the additive is a curing agent. In some embodiments, the amount of additive in the 3D-printed epoxy composition is about 5 wt % to about 30 wt %, about 5 wt % to about 25 wt %, about 5 wt % to about 20 wt %, about 5 wt % to about 15 wt %, about 5 wt % to about 10 wt %, about 10 wt % to about 30 wt %, about 10 wt % to about 25 wt %, about 10 wt % to about 20 wt %, about 10 wt % to about 15 wt %, about 15 wt % to about 30 wt %, about 15 wt % to about 25 wt %, about 15 wt % to about 20 wt %, about 20 wt % to about 30 wt %, about 20 wt % to about 25 wt %, about 25 wt % to about 30 wt %, or about 5 wt %, about 10 wt %, about 15 wt %, about 20 wt %, about 25 wt %, or about 30 wt %. In some embodiments, the amount of additive in the 3D-printed epoxy composition is about 5 wt % to about 30 wt %. In some embodiments, the amount of additive in the 3D-printed epoxy composition is about 10 wt % to about 25 wt %. In some embodiments, the amount of additive in the 3D-printed epoxy composition is about 15 wt % to about 20 wt %. In some embodiments, the additive is a polyetheramine. An exemplary polyetheramine is JEFFAMINE® D-230 polyetheramine (a difunctional, primary amine with an average molecular weight of about 230 characterized by repeating oxypropylene units in the backbone, sold by Huntsman Corporation, The Woodlands, TX).

In some embodiments, the thermally-curable epoxy resin and the curing agent are present in a ratio of about 75:25, or about 70:30, or about 65:35, or about 60:40, or about 80:20, or about 85:15. In some embodiments, the thermally-curable epoxy resin and the curing agent are present in a ratio of about 75:25.

Properties of the Epoxy Composition

In some embodiments, the epoxy composition of the present disclosure exhibits increased strain tolerance or increased flexural strain as compared to the same epoxy composition that does not include the sliding-ring polymer additive. In some embodiments, the epoxy composition containing a sliding-ring polymer additive exhibits a strain tolerance or flexural strain of about 0.15 to about 0.4, such as about 0.15 to about 0.35, about 0.15 to about 0.3, about 0.15 to about 0.25, about 0.15 to about 0.2, about 0.2 to about 0.4, about 0.2 to about 0.35, about 0.2 to about 0.3, about 0.2 to about 0.25, about 0.25 to about 0.4, about 0.25 to about 0.35, about 0.25 to about 0.3, about 0.3 to about 0.4, about 0.3 to about 0.35, about 0.35 to about 0.4, or about 0.15, about 0.2, about 0.23, about 0.25, about 0.3, about 0.35, or about 0.4. In some embodiments, the epoxy composition is 3D-printed.

In some embodiments, the epoxy composition containing a sliding-ring polymer additive exhibits a strain tolerance or flexural strain that is increased by at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, or at least about 90% as compared to the same epoxy composition that does not include the sliding-ring polymer additive. In some embodiments, the epoxy composition containing a sliding-ring polymer additive exhibits a strain tolerance or flexural strain that is increased by at least about 90% as compared to the same epoxy composition that does not include the sliding-ring polymer additive. In some embodiments, the epoxy composition is 3D-printed.

In some embodiments, the epoxy composition of the present disclosure exhibits increased flexural toughness as compared to the same epoxy composition that does not include the sliding-ring polymer additive. In some embodiments, the epoxy composition containing a sliding-ring polymer additive exhibits flexural toughness of about 10 J·m$^3$ to about 30 J·m$^3$, about 10 J·m$^3$ to about 25 J·m$^3$, about 10 J·m$^3$ to about 20 J·m$^3$, about 10 J·m$^3$ to about 15 J·m$^3$, about 10 J·m$^3$ to about 12 J·m$^3$, about 12 J·m$^3$ to about 30 J·m$^3$, about 12 J·m$^3$ to about 25 J·m$^3$, about 12 J·m$^3$ to about 20 J·m$^3$, about 12 J·m$^3$ to about 15 J·m$^3$, about 15 J·m$^3$ to about 30 J·m$^3$, about 15 J·m$^3$ to about 25 J·m$^3$, about 15 J·m$^3$ to about 20 J·m$^3$, about 20 J·m$^3$ to about 30 J·m$^3$, about 20 J·m$^3$ to about 25 J·m$^3$, about 25 J·m$^3$ to about 30 J·m$^3$, or about 10 J·m$^3$, about 11 J·m$^3$, about 12 J·m$^3$, about 13 J·m$^3$, about 14 J·m$^3$, about 15 J·m$^3$, about 16 J·m$^3$, about 17 J·m$^3$, about 18 J·m$^3$, about 19 J·m$^3$, about 20 J·m$^3$, about 25 J·m$^3$, or about 30 J·m$^3$. In some embodiments, the epoxy composition containing a sliding-ring polymer additive exhibits flexural toughness of about 10 J·m$^3$ to about 20 J·m$^3$. In some embodiments, the epoxy composition containing a sliding-ring polymer additive exhibits flexural toughness of about 11 J·m$^3$ to about 15 J·m$^3$. In some embodiments, the epoxy composition containing a sliding-ring polymer additive exhibits flexural toughness of about 12 J·m$^3$. In some embodiments, the epoxy composition is 3D-printed. In some embodiments, the epoxy composition of the present disclosure exhibits increased flexural toughness as compared to the same epoxy composition that does not include the sliding-ring polymer additive with minimal changes in the flexural strength.

In some embodiments, the epoxy composition containing a sliding-ring polymer additive exhibits flexural toughness that is increased by at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, or at least about 90% as compared to the same epoxy composition that does not include the sliding-ring polymer additive. In some embodiments, the epoxy composition containing a sliding-ring polymer additive exhibits flexural toughness that is increased by at least about 15% as compared to the same epoxy composition that does not include the sliding-ring polymer additive. In some embodiments, the epoxy composition is 3D-printed.

In some embodiments, the epoxy composition of the present disclosure exhibits increased impact resistance as compared to the same epoxy composition that does not include the sliding-ring polymer additive. In some embodiments, "increased impact resistance" refers to less crack formation, propagation, or both, as compared to the same epoxy composition that does not include the sliding-ring polymer additive when the compositions are subjected to low velocity impact, such as an applied force. In some embodiments, the applied force is between about 20 J and about 40 J, or about 35 J. In some embodiments, the epoxy composition of the present disclosure resists or restricts crack formation and maintains structural integrity after being subjected to low velocity impact, such as an applied force. In some embodiments, the applied force is between about 20 J and about 40 J, or about 35 J.

Method of Preparing an Epoxy Composition

Provided in the present disclosure is a method of preparing an epoxy composition, such as an epoxy composition described in this application. In some embodiments, the method includes mixing a sliding-ring polymer additive and fumed silica with a thermally-cured epoxy resin. In some embodiments, the sliding-ring polymer additive is as described in the present disclosure. In some embodiments, the sliding-ring polymer additive is as described in in any one of U.S. Pat. Nos. 7,612,142; 7,622,527; 7,799,867; 7,847,049; 7,893,168; 7,943,718; 7,981,943; 8,007,911; 8,450,415; 8,580,906; 9,068,051; and 9,266,972; each of which is incorporated by reference in its entirety. In some embodiments, the composition is cured.

Also provided in the present disclosure is a method of preparing a 3D-printed epoxy composition, such as a 3D-printed epoxy composition described in this disclosure. In some embodiments, the 3D-printed epoxy composition includes a 3D printing ink. In some embodiments, the 3D printing ink includes an epoxy composition. In some embodiments, the epoxy composition contains two or more epoxy resins. In some embodiments, the epoxy resin contains a bisphenol A-based epoxy resin, a polyetheramine resin, or combination thereof. In some embodiments, the bisphenol A-based epoxy resin is EPON™ Resin 826. In some embodiments, the epoxy resin contains a bisphenol A-based epoxy resin and a polyetheramine resin. In some embodiments, the polyetheramine resin is JEFFAMINE® D-230 polyetheramine. In some embodiments, the method includes mixing a sliding-ring polymer additive and fumed silica with a thermally-cured epoxy resin. In some embodiments, the sliding-ring polymer additive is as described in the present disclosure. In some embodiments, the sliding-ring polymer additive is as described in in any one of U.S. Pat. Nos. 7,612,142; 7,622,527; 7,799,867; 7,847,049; 7,893,168; 7,943,718; 7,981,943; 8,007,911; 8,450,415; 8,580,906; 9,068,051; and 9,266,972; each of which is incorporated by reference in its entirety. In some embodiments, the 3D-printed structures are cured. In some embodiments, the 3D-printed structures are cured by heat.

Methods of Using the Epoxy Composition Containing a Sliding-Ring Polymer Additive Provided in this disclosure is a method of treating a subterranean formation. Also provided is a method for providing long-term zonal isolation in oil wells (that is, subterranean formations) including providing to an oil well an epoxy composition that contains a sliding-ring polymer additive such as described in this disclosure. In some embodiments, the sliding-ring polymer additive is as described in any one of U.S. Pat. Nos. 7,612,142; 7,622,527; 7,799,867; 7,847,049; 7,893,168; 7,943,718; 7,981,943; 8,007,911; 8,450,415; 8,580,906; 9,068,051; and 9,266,972; each of which is incorporated by reference in its entirety. In some embodiments, the providing occurs above the surface. The providing can also occur in the subterranean formation.

The subterranean formation can contain a wellbore containing a steel casing or multiple casings, a cement sheath in the annuli, and optionally a packer and a production tubing. The cement sheath, can experience stresses and annular pressure buildup due to, for example, gas flow through microchannels in the annulus, forming microannuli, and fractures (for example, microfractures), cracks and clefts within or around the cement sheath, the casing, or the production tubing. This can result in a deterioration of the mechanical properties of the cement and lead to formation of micro-cracks and fractures, which affect the production and increase the cost of operation.

In some embodiments, the epoxy composition is stable in downhole conditions. In some embodiments, the sliding-ring polymer additive allows for uniform distribution of the stresses experienced in the epoxy matrix, thus enhancing the properties of the epoxy composition.

EXAMPLES

Example 1—Synthesis of Polyrotaxanes

A series of polyrotaxanes were prepared from linear polymers that included polyethylene glycol (PEG), polypropylene glycol (PPG), block copolymers of PEG and PPG, and polysiloxanes (PS) that were terminated with one or more of an amine, carboxylate, azide, isocyanate, carbonyl chloride, halide, and thiol; and ring components that included α-cyclodextrin (α-CD), β-cyclodextrin (β-CD), and γ-cyclodextrin (γ-CD).
Inclusion Complexes An exemplary polyrotaxane inclusion complex was prepared as follows.

9.0 g of carboxylate terminated polyethylene glycol (HOOC-PEG-COOH, MW=20000) and 36.0 g of α-cyclodextrin (α-CD) were dissolved in 100 mL deionized water and kept refrigerated for 24 h. The polyrotaxane inclusion complex formed as a white paste which was dried at room temperature under vacuum or freeze-dried, to obtain a white powder, designated as inclusion complex A.

Similar methods were employed to obtain the inclusion complexes of carboxy-terminated polypropylene glycol (HOOC-PPG-COOH) and carboxy-terminated polysiloxanes (HOOC-PS-COOH) with β-cyclodextrin (β-CD) and γ-cyclodextrin (γ-CD), respectively.

10 grams (g) of ($NH_2$-PS-$NH_2$, MW=25000) and 30.0 g of γ-cyclodextrin (γ-CD) were dissolved in 100 milliliters (mL) deionized water and stirred at room temperature for 12 hours (h). The polyrotaxane formed as a white precipitate, which was filtered and dried at 80° C. under vacuum or freeze-dried, to obtain a white powder, designated as γ-CD-PS-$NH_2$.

A similar method was employed to obtain the inclusion complexes of R-terminated PEG, PPG, PS and block polymers of PEG and PPG. α-cyclodextrin (α-CD), β-cyclodextrin (β-CD), γ-cyclodextrin (γ-CD), or combination of these cyclic compounds with linear polymers.
End-Capped Inclusion Complexes The dried inclusion complex A (10 g) was mixed with adamantanamine (0.13 g), (benzotriazol-1-yloxy)tris(dimethylamino)phosphonium hexafluorophosphate (0.4 g), and ethyldiisopropylamine (0.12) dissolved in 80 mL dimethylformamide. The mixture was reacted at 2-5° C. for 24 h. The dispersion was filtered or centrifuged and washed with a mixture of dimethylformamide/methanol 2-3 times. The precipitates were dissolved in dimethylsulfoxide and precipitated by adding deionized water. The precipitates were filtered/centrifuged and dried at room temperature under vacuum or freeze dried, to obtain polyrotaxane A.

When there are other functionalities (such as amine, azide, isocyanate, carbonyl chloride, halides, thiol) present in complex A, capping agents such as adamantaneacetic acid, 2,4-dinitrofluorobenzene, and amine-terminated aromatic compounds have been employed.
Functionalized Polyrotaxanes 3.5 g of polyrotaxane A was dissolved in 1 N aqueous NaOH (350 mL) at 0-5° C. Propylene oxide (26.8 g) was added drop-wise, and the mixture stirred overnight from 0-5° C. to room temperature with the melting of ice in the bath. The functionalized polyrotaxane was dialyzed against deionized water for 3 days. The water was evaporated or the solution was freeze-dried under vacuum to obtain functionalized polyrotaxane A.

The described functionalization is based on hydroxypropylation. However, functionalization such as methylation, hydroxypropylation, tritylation, acetylation, trimethylsilylation, phenylcarbamation, dansylation, and nitration, can also be used to generate functionalized polyrotaxanes.
Sliding-Ring Polymer Synthesis 9.5 g of polyacrylic acid (MW=450,000) was dissolved in 190 mL dimethyl sulfoxide. 0.12 g of 1,1'-carbonyldiimidazole dissolved in 5 mL dimethylsulfoxide was then added to the solution and the mixture was stirred at 50° C. for 12-15 h under an inert atmosphere. The reaction mixture was cooled to room temperature. A solution of functionalized polyrotaxane A (0.5 g in 5 mL dimethylsulfoxide) was added over 30 min under an inert atmosphere with stirring. After stirring for 30 min at room temperature, the reaction mixture was heated to 65-70° C. for 72 h. The sliding-ring polymer was precipitated from tetrahydrofuran and filtered. The polymer was dried at room temperature under vacuum or freeze-dried, to obtain sliding-ring polymer A.

Other than polyacrylic acid, polymers with high molecular weight and functionalities such as carboxylic acid, maleic acid, and amine groups were also employed to obtain sliding-ring polymers.
Cross-Linked Polyrotaxanes 20 g of γ-CD-PS-$NH_2$ was dispersed in acetonitrile (250 mL) and triethylamine (10 mL) was added. A solution of cyanuric chloride (CC; 2 g in 20 mL acetonitrile) was added to the above mixture at room temperature with stirring. The reaction mixture was refluxed for 8 hours and the precipitates were filtered and dried at 80° C. to obtain the cross-linked polyrotaxane γ-CD-PS-NH—CC.

Example 2—Formulation of Epoxy Compositions

Figure 4:
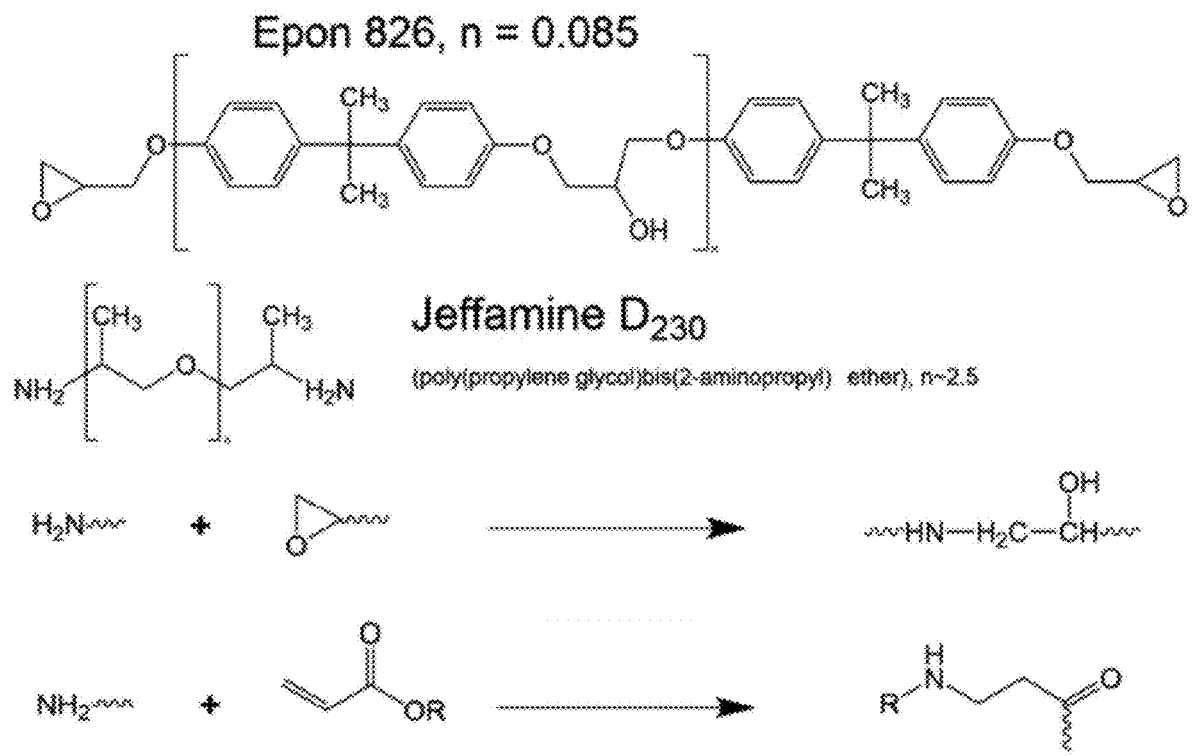
FIG. 4 is a schematic showing the structures of an exemplary epoxy resin and exemplary polyetheramine and exemplary reaction pathways to form exemplary epoxy compositions.

A two-part epoxy using EPON' Resin 826 (a low viscosity, light colored liquid bisphenol A based epoxy resin sold by Hexion Inc., Columbus, OH) and JEFFAMINE® D-230 polyetheramine (a difunctional, primary amine with an average molecular weight of about 230 characterized by repeating oxypropylene units in the backbone, sold by Huntsman Corporation, The Woodlands, TX) were mixed at a ratio of 3:1 by weight through mechanical stirring. The resin mixture was centrifuged to remove air bubbles at 2000 rotations per minute for 40 seconds. The chemical formulation and reactions are shown in FIG. 4.

Figure 5:
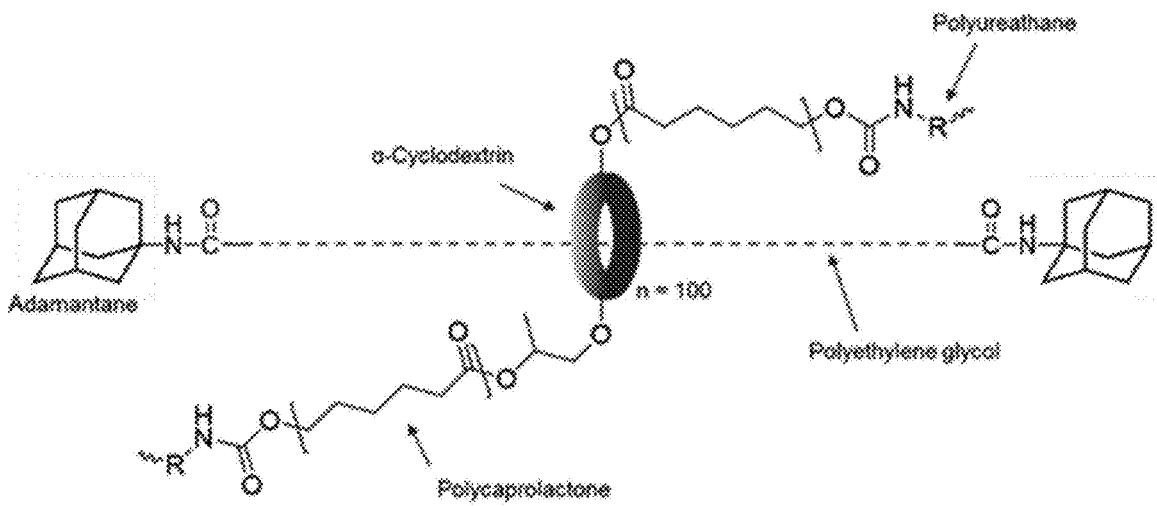
FIG. 5 depicts the structure of exemplary polyrotaxanes beads (PRB).

A second composition that contained the same two-part epoxy and cross-linked polyrotaxane beads (PRB) was prepared. The composition contained 10 wt % of PRB with respect to the total weight of the two-part resin. Before adding PRBs to the resin, the PRB were heated at 110° C. for one hour to remove absorbed moisture. Then, after cooling to room temperature, the PRB were added to JEF-FAMINE® D-230 polyetheramine and mixed vigorously before adding EPON™ Resin 826. The resin was centrifuged for 40 seconds at 2000 RPM before casting. The cross-linked polyrotaxane beads were from Advanced Softmaterials (Japan) (FIG. 5). The polyrotaxane beads were composed of a mixture of polyethyleneglycol, alpha-cyclodextrin, polycaprolactum, polyurethane, and adamantane. Briefly, alpha-cyclodextrin was threaded on the polyethylene chain and subsequently capped on both side of the polyethylene glycol chain by adamantane. The polycaprolactum and polyurethane were linked on the surface of cyclodextrin. This generated the cross-linked polyrotaxanes beads. The acrylate moieties on the polyrotaxane monomers reacted with the amines through an aza-Michael addition. Polyrotaxane beads (PRB), a pre-crosslinked polyrotaxane structure, was added into the epoxy mixture. The epoxide reacted with hydroxyl groups of the cyclodextrin to form a crosslinked PRB epoxy structure owing to the enhanced strain tolerance observed in PRB. The formulation was cured at 225° F. for 1 hour and at 266° F. for 1.5 hours.

Example 3—Epoxy Ink for 3D-Printing

Topological optimization and filler alignment are driving factors for 3D-printed structures that facilitate the improved mechanical properties in epoxy composites. It has been demonstrated that the alignment of carbon fibers in epoxy through hierarchical extrusion 3D-printed structures mimicked the mechanical performance of balsa wood. The polyrotaxane can crosslink into polymer networks and endow dynamic behavior in epoxy-based polymers and in other polymers and can offer mechanical toughening. 3D printing the epoxy/PR composites offers the opportunity to develop hierarchical structures with load-bearing capabilities on the molecular and macroscopic level to create tough materials.

3D-printing inks were formulated by mixing EPON™ Resin 826 and JEFFAMINE® D-230 polyetheramine in a 3:1 wt % ratio. A planetary centrifugal mixer was employed to ensure homogeneous mixing of each component. Samples were printed using a HyRel High Resolution Engine with a 14-gauge nozzle and STL files were sliced using Slic3r software. The curing of 3D-printed structures was carried out by heating the samples at 107° C. for 90 minutes. Subsequently, the temperature was raised to 130° C. and kept for 60 minutes.

Example 4—Microscopic Analysis

Scanning electron microscopy (SEM) images were captured using a Jeol IT800 Ultrahigh Resolution Field Emission SEM with a varying working distance to maximize image resolution and an accelerating voltage of 7 kV. Epoxy fracture surfaces were sputter coated to prepare a conductive surface for imaging using a 5 nm layer of Au/Pd.

Figure 6C:
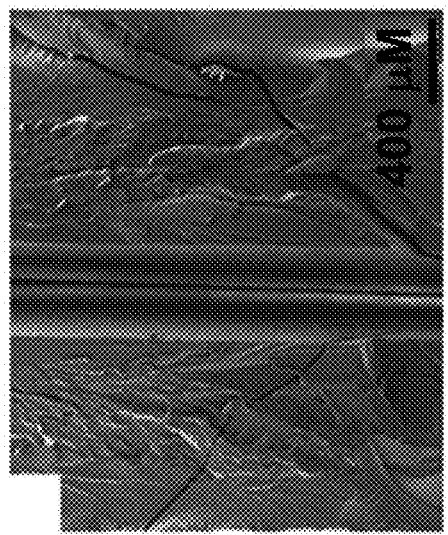
FIGS. 6A-6F are scanning electron microscopy images of the fracture surface of flexural samples of neat epoxy (FIGS. 6A-6C) and epoxy/PRB (FIGS. 6D-6F).
Figure 6F:
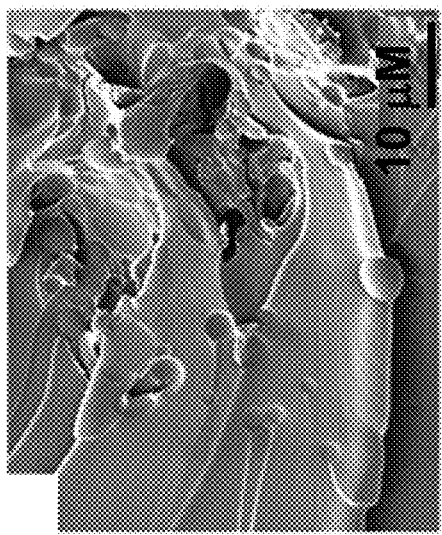
Figure 6B:
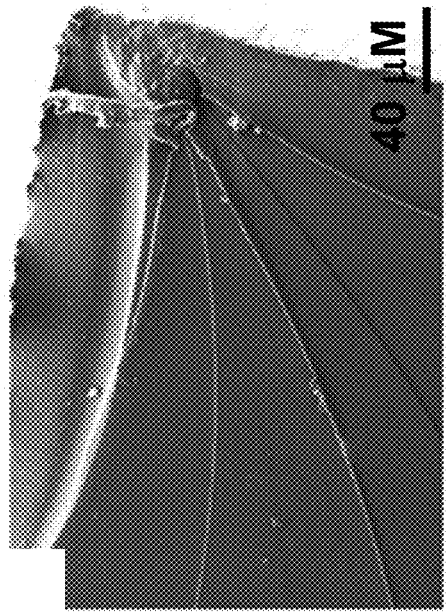
Figure 6E:
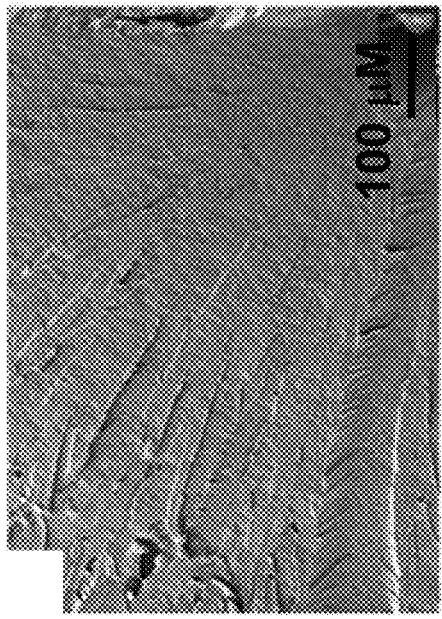
Figure 6A:
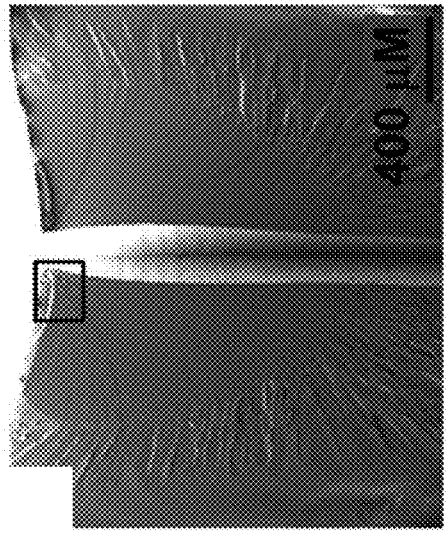
Figure 6D:
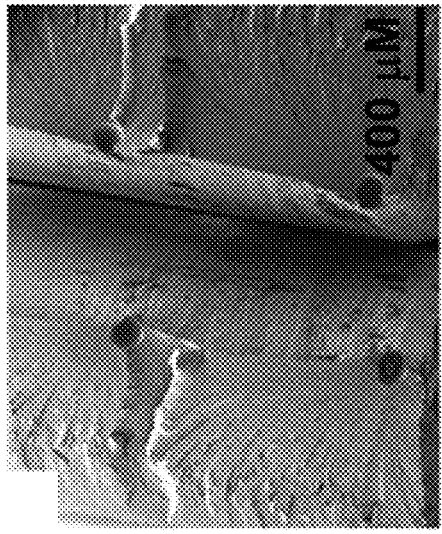

Scanning electron microscopy (SEM) images were recorded on the fractured samples of the neat epoxy and epoxy/PRB composites. Brittle fractures and prominent crack formation were observed in the neat epoxy (FIGS. 6A-6C). The epoxy/PRB revealed that premature fracture was caused by large void formation across these samples (FIGS. 6D-6F). Additionally, the ductile fractures and crack pinning effect were evident from the SEM images of epoxy/PRB composites. The spherical particles of PRB were attached with the epoxy matrix to provide toughness within the epoxy matrix. The interfacial interaction through chemical bonding may further improve the toughness of the epoxy/PRB composites.

Example 5—Flexural Toughness

Epoxy flexural samples were prepared by mold casting in aluminum mold. The resins prepared according to Example 2 were carefully poured into the mold to avoid void formation and heated to 107° C. for 90 minutes. Subsequently, the temperature was raised to 130° C. and kept for 60 minutes. The cured samples were cooled to room temperature and removed from the mold. The samples were machined and polished to form a smooth surface with sample thickness between 2 mm and 3 mm for mechanical testing.

Figure 7A:
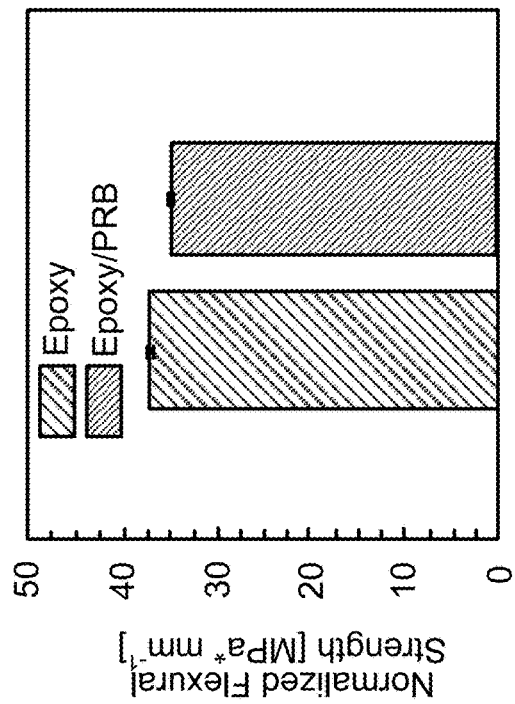
FIGS. 7A-7D are graphs showing the mechanical properties of epoxy and epoxy/PRB composites, including flexural stress-strain curves (FIG. 7A), flexural strength (FIG. 7B), toughness (FIG. 7C), and flexural modulus (FIG. 7D).
Figure 7B:
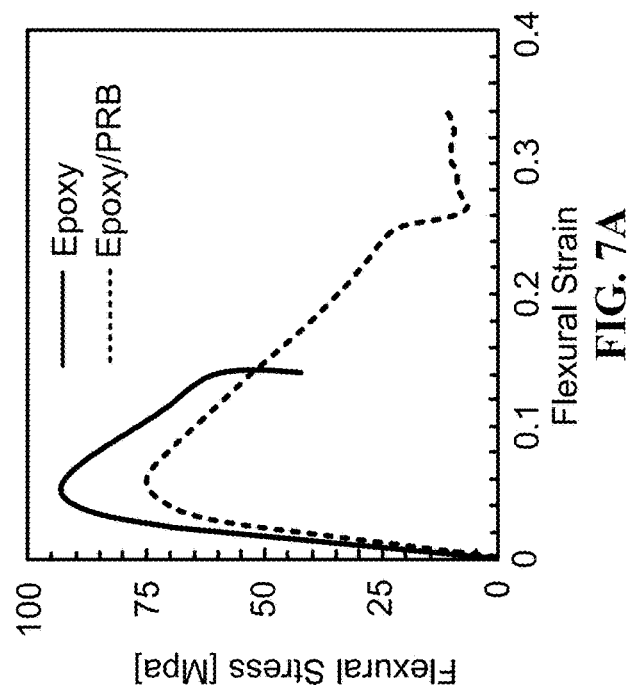
Figure 7C:
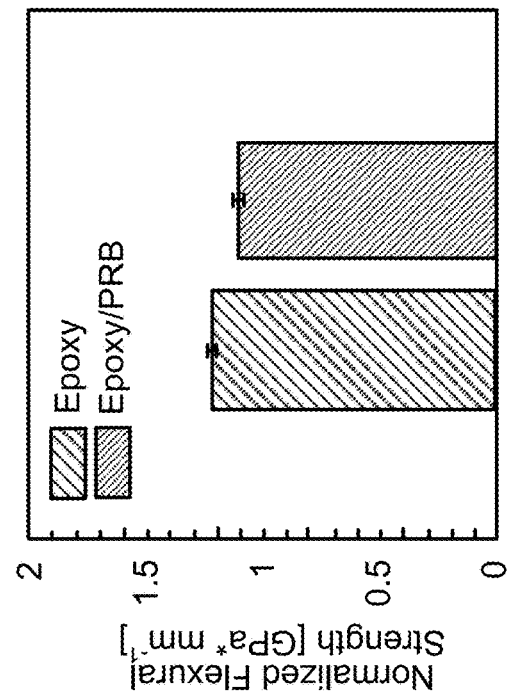

The flexure tests of neat epoxy and epoxy/PRB were recorded on the universal testing systems (Instron Instruments) with center point loading. Six specimens per sample set were prepared, polished, and tested for reproducible results. The epoxy/PRB showed increased strain tolerance with three out of six samples not fracturing up to 30 mm of extension. The stress-strain curves of epoxy and epoxy/PRB (FIG. 7A) clearly demonstrate the effect of PRB in epoxy/PRB composites. The maximum strain at break for epoxy and epoxy/PRB was 0.12 and 0.23, respectively, which is about 90% increase in the strain. The flexural strength of epoxy/PRB was lower than neat epoxy because of high compressive strength of the neat resin. The flexural strength was 36.9 MPa and 35.0 MPa for epoxy and epoxy/PRB, respectively (FIG. 7B). However, an increase in the toughness of epoxy/PRB compared to neat epoxy was observed. The flexural toughness of epoxy and epoxy/PRB was observed to be 10.2 MJ m$^3$ and 12 MJ m$^3$, respectively, which was a 17% increase in the flexural toughness (FIG. 7C).

Figure 7D:
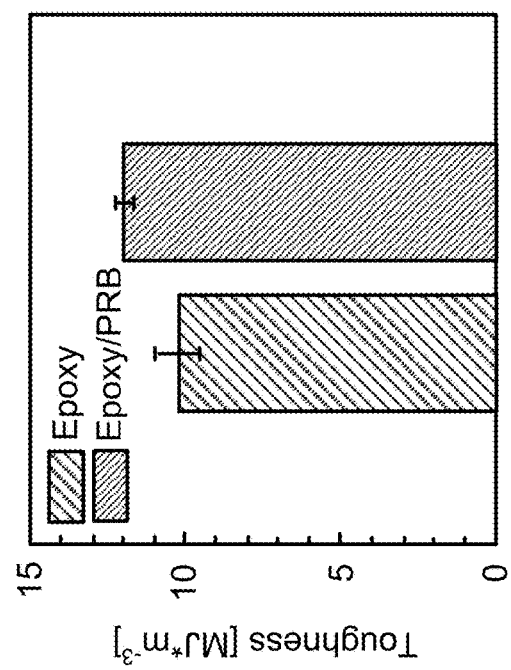

It is known that addition of elastic materials in the brittle matrix substantially reduces the flexural strength. No noticeable decrease in strength was observed, but the incorporation of PRB in epoxy resulted in a decrease in the flexural modulus. The flexural modulus for epoxy and epoxy/PRB was 1.22 GPa and 1.11 GPa, respectively (FIG. 7D).

The mechanical property measurements of the epoxy and epoxy/PRB composites demonstrated the effect of sliding-ring polymers in epoxy matrix: the flexural toughness has been improved with minimum change in flexural strength of the materials.

Example 6—Impact Strength

Silicone cube molds were used to cast the epoxy and epoxy/PRB composites prepared according to Example 2. The resin mixtures were poured into the mold and were degassed in a vacuum chamber to remove voids. The resins were allowed to set at room temperature for 48 hours before the samples were subjected to impact strength measurements. After 48 hours, samples were placed in the oven for 60 minutes at 130° C. Samples were cooled to room temperature before they were removed from the mold. The cured samples were polished into 45×45×25 mm cubes for impact strength testing.

Figure 8A:
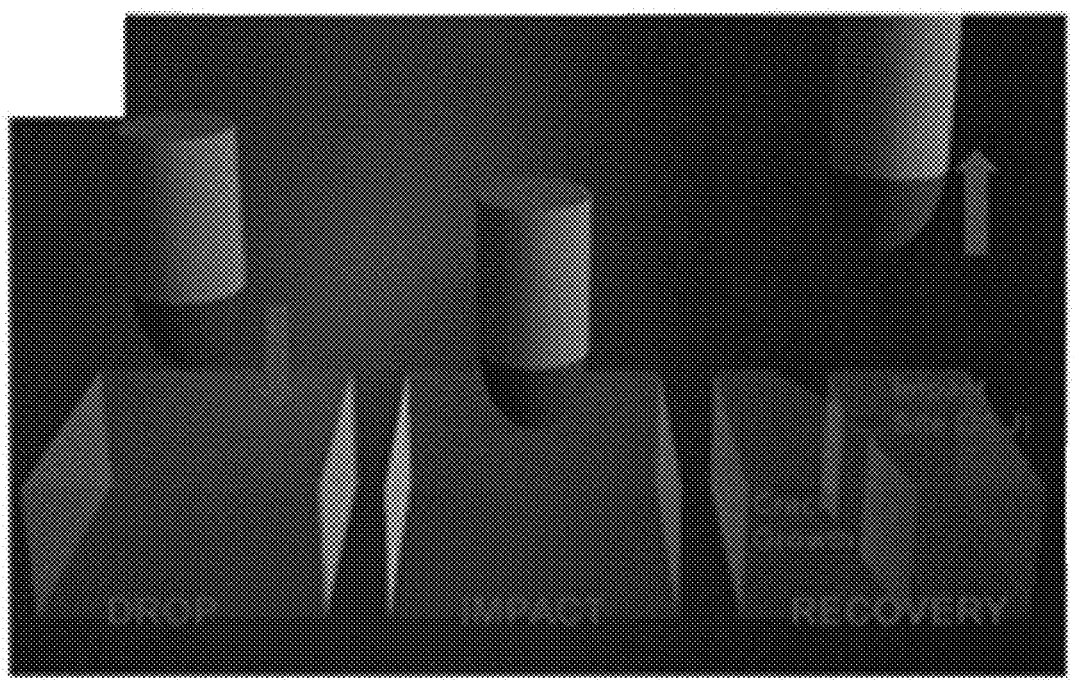
FIGS. 8A-8B are schematic representations of impact drop tests of neat epoxy (FIG. 8A) and epoxy/PRB (FIG. 8B).
Figure 8B:
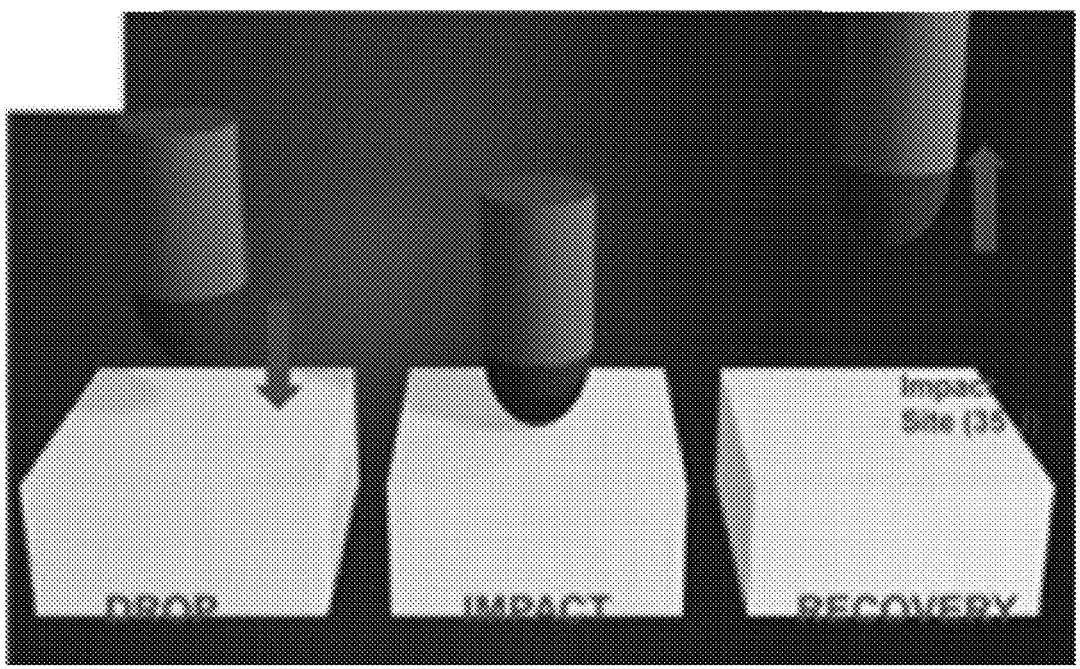

Three specimens of each design (neat epoxy and epoxy/PRB) were subjected to impact testing under the impact load of 35 J. FIG. 8A illustrates the impact drop weight process through a schematic representation of impact loading and recoil for neat epoxy and FIG. 8B depicts the impact mechanism for an epoxy/PRB composite.

Figure 9A:
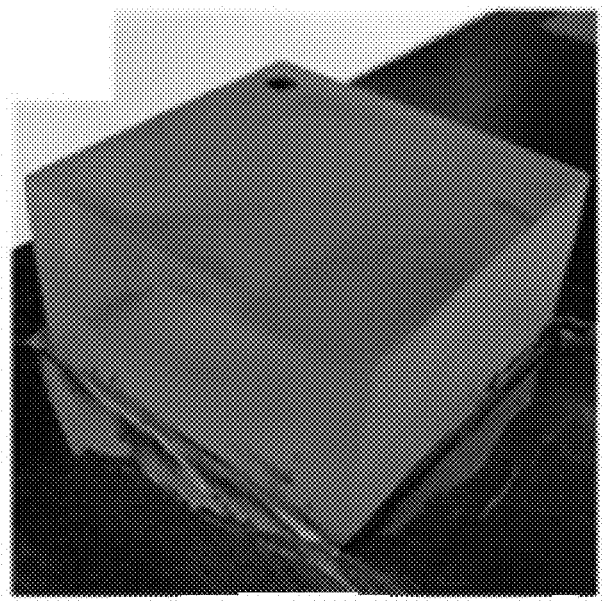
FIGS. 9A-9D show the results of impact testing on cured samples (45 mm×45 mm×25 mm) of neat epoxy (FIG. 9A) and epoxy/PRB (FIG. 9B) and the crack propagation or failure of cured samples after 35 J impact on neat epoxy (FIG. 9C) and epoxy/PRB (FIG. 9D).
Figure 9B:
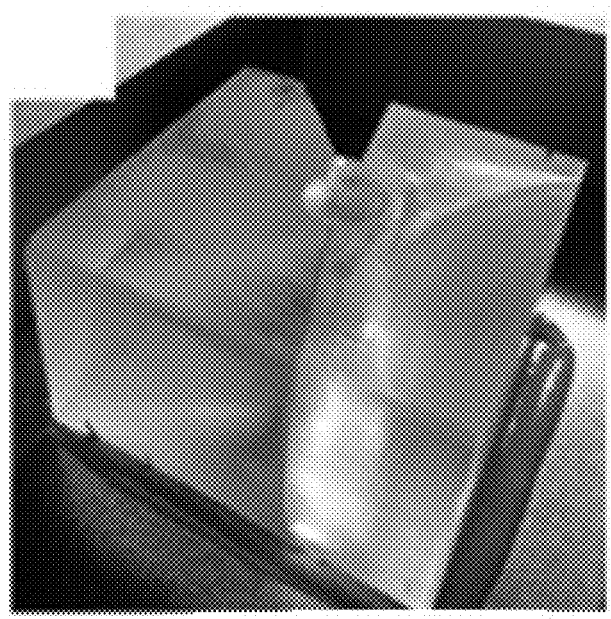
Figure 9C:
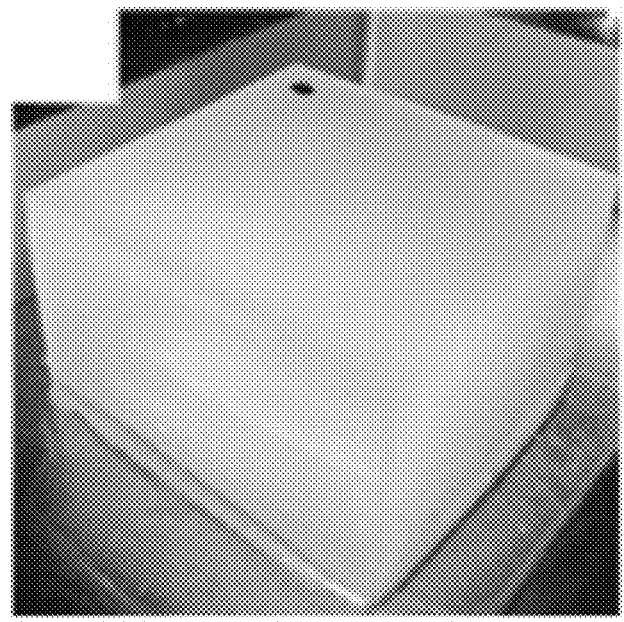
Figure 9D:
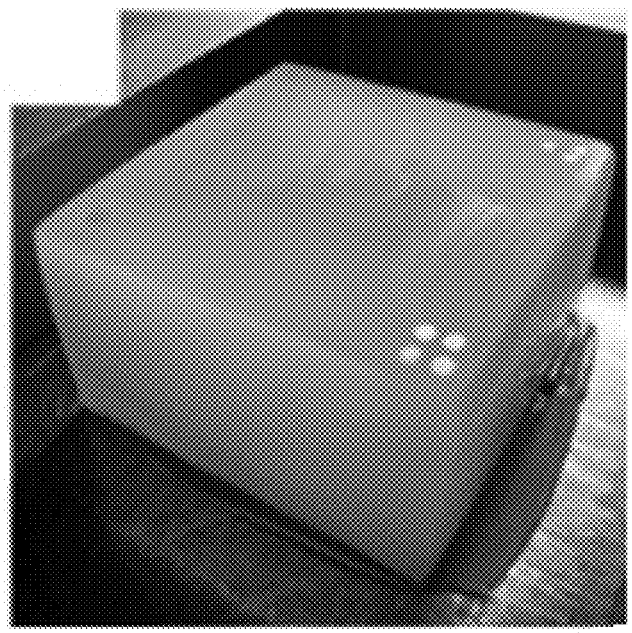

It was evident from the impact resistance analysis of neat epoxy and epoxy/PRB that the reinforcement of PRB in an epoxy matrix showed exceptional impact resistance. The neat epoxy samples (FIGS. 9A-9B) were rupturing under the impact load while the epoxy/PRB composite samples (FIGS. 9C-9D) sustained the impact load of 35 J. No significant crack propagation in the epoxy/PRB samples after impact resistance tests was observed. This study confirmed the effectiveness of stress distribution within the materials upon sudden load. The PRB consisted of molecular entities within its structure that slide when forces were exerted on the structures. Owing to sub-nanometer movement of these components within the epoxy matrix, the uniform distribution of stresses was observed that restricted the crack formation and maintained the structural integrity of the materials.

In the flexural toughness tests, a similar phenomenon of increased strain for epoxy/PRB was observed; the impact resistance analysis further supports the functioning mechanism of the sliding-ring polymers at bulk macroscopic level.

What is claimed is:

1. An epoxy composition comprising:
   a thermally-curable epoxy resin;
   about 1 wt % to about 25 wt % of fumed silica; and
   a sliding-ring polymer additive that is a cross-linked polyrotaxane bead, wherein the cross-linked polyrotaxane bead comprises:
      a linear polymer;
      at least one ring compound substituted with polyurethane, polycaprolactone, or a combination thereof, wherein the linear polymer is threaded through the opening of the ring compound; and
      stopper groups disposed at both end terminals of the linear polymer.

2. The epoxy composition of claim 1, wherein the thermally-curable epoxy resin is present in an amount of about 50 wt % to about 95 wt %, about 55 wt % to about 95 wt %, about 60 wt % to about 90 wt %, about 65 wt % to about 90 wt %, about 75 wt % to about 85 wt %, or about 80 wt % to about 85 wt % of the epoxy composition.

3. The epoxy composition of claim 1, wherein the fumed silica is present in an amount of about 1 wt % to about 10 wt %, about 5 wt % to about 15 wt %, or about 5 wt % to about 10 wt % of the epoxy composition.

4. The epoxy composition of claim 1, wherein the fumed silica is present in an amount of about 7.5 wt % of the epoxy composition.

5. The epoxy composition of claim 1, wherein the cross-linked polyrotaxane beads are surface-functionalized with epoxide rings.

6. The epoxy composition of claim 1, wherein the sliding-ring polymer additive is present in an amount of about 1 wt % to about 25 wt %, about 1 wt % to about 15 wt %, about 2 wt % to about 10 wt %, about 2.5 wt % to about 5 wt %, about 5 wt % to about 20 wt %, or about 10 wt % to about 15 wt % of the epoxy composition.

7. The epoxy composition of claim 1, further comprising a curing agent.

8. The epoxy composition of claim 7, wherein the curing agent is an etheramine or an aliphatic or aromatic diamine, triamine, tetraamine, or combinations thereof.

9. The epoxy composition of claim 7, wherein the epoxy resin and the curing agent are present in a ratio of about 75:25.

10. The epoxy composition of claim 1, wherein the epoxy composition is able to be 3D-printed.

11. The epoxy composition of claim 1, wherein the epoxy composition exhibits increased strain tolerance or flexural strain as compared to the same epoxy composition without the sliding-ring polymer additive.

12. The epoxy composition of claim 1, wherein the epoxy composition exhibits a strain tolerance or flexural strain of about 0.2 to about 0.3.

13. The epoxy composition of claim 1, wherein the epoxy composition exhibits improved flexural toughness as compared to the same composition without the sliding-ring polymer additive.

14. The epoxy composition of claim 1, wherein the epoxy composition has a flexural toughness of about 10 J·m$^3$ to about 20 J·m$^3$ or about 11 J·m$^3$ to about 15 J·m$^3$.

15. The epoxy composition of claim 1, wherein the epoxy composition has a flexural toughness of about 12 J·m$^3$.

16. The epoxy composition of claim 1, wherein the epoxy composition exhibits improved impact resistance as compared to the same composition without the sliding-ring polymer additive.

17. A method for enhancing the impact resistance of an epoxy composition, the method comprising adding a sliding-ring polymer additive that is a cross-linked polyrotaxane bead to a thermally-curable epoxy resin, the cross-linked polyrotaxane bead comprising:
   a linear polymer;
   at least one ring compound substituted with polyurethane, polycaprolactone, or a combination thereof, wherein the linear polymer is threaded through the opening of the ring compound; and
   stopper groups disposed at both end terminals of the linear polymer.

18. The method of claim 17, wherein the epoxy composition further comprises about 1 wt % to about 25 wt % of the composition fumed silica.

19. The method of claim 17, wherein the epoxy composition exhibits improved impact resistance as compared to the same composition without the sliding-ring polymer additive.

20. A method for enhancing the flexural toughness of an epoxy composition, the method comprising adding a sliding-ring polymer additive that is a cross-linked polyrotaxane bead to a thermally-curable epoxy resin, the cross-linked polyrotaxane bead comprising:
   a linear polymer;
   at least one ring compound substituted with polyurethane, polycaprolactone, or a combination thereof, wherein the linear polymer is threaded through the opening of the ring compound; and
   stopper groups disposed at both end terminals of the linear polymer.

21. The method of claim 20, wherein the epoxy composition further comprises about 1 wt % to about 25 wt % of the composition fumed silica.

22. The method of claim 20, wherein the epoxy composition exhibits improved flexural toughness as compared to the same composition without the sliding-ring polymer additive.

* * * * *